(12) United States Patent
Nakamura

(10) Patent No.: US 6,959,210 B2
(45) Date of Patent: Oct. 25, 2005

(54) FOLDABLE PORTABLE RADIO TERMINAL

(75) Inventor: Shinya Nakamura, Saitama (JP)

(73) Assignee: NEC Corporation, Tokyo (JP)

( * ) Notice: Subject to any disclaimer, the term of this patent is extended or adjusted under 35 U.S.C. 154(b) by 887 days.

(21) Appl. No.: 09/897,994

(22) Filed: Jul. 5, 2001

(65) Prior Publication Data

US 2001/0051510 A1 Dec. 13, 2001

(30) Foreign Application Priority Data

Jul. 6, 2000 (JP) ........................................ 2000-210714

(51) Int. Cl.[7] .......................... H01F 27/30; H04M 1/03
(52) U.S. Cl. .................... 455/575.3; 336/200; 336/208; 455/575.5
(58) Field of Search ...................... 343/702; 455/575.1, 455/575.3, 575.5, 575.7; 336/199, 200, 205, 206, 207, 208

(56) References Cited

U.S. PATENT DOCUMENTS

| | | | |
|---|---|---|---|
| 5,027,394 A | 6/1991 | Ono et al. | |
| 5,905,966 A | 5/1999 | Yoshihara et al. | |
| 5,926,748 A | 7/1999 | Yoshihara et al. | |
| 5,933,330 A | 8/1999 | Beutler et al. | |
| 5,999,831 A | 12/1999 | Itoh | |
| 6,421,547 B1 | 7/2002 | Frohlund et al. | |

FOREIGN PATENT DOCUMENTS

| | | |
|---|---|---|
| EP | 0 464 767 A1 | 1/1992 |
| EP | 0 622 864 A1 | 11/1994 |
| JP | 58-153468 | 10/1983 |
| JP | 64-89845 | 4/1989 |
| JP | 2-46919 | 3/1990 |
| JP | 5-327136 | 12/1993 |
| JP | 7-38461 | 2/1995 |
| JP | 8-18640 | 1/1996 |
| JP | 8-125299 | 5/1996 |
| JP | 9-270728 | 10/1997 |
| JP | 10-41645 | 2/1998 |
| JP | 11-340867 | 12/1999 |
| JP | 2000-41091 | 2/2000 |
| JP | 2001-267696 | 9/2001 |
| WO | WO 00/33541 | 6/2000 |

Primary Examiner—Harry S. Hong
(74) Attorney, Agent, or Firm—Foley & Lardner LLP

(57) ABSTRACT

A foldable portable radio terminal comprising an upper housing, a lower housing and a hinge for connecting housings is provided, where an antenna is arranged adjacently to the hinge in the lower housing. A connection unit which connects an upper-housing circuit and a lower-housing circuit has a wiring length longer than a spacing between the upper-housing circuit and the lower-housing circuit. The connection unit has an inductance provided by a portion partially rolled up in spiral or in coil, which acts as a load impedance to a high-frequency current generated on the housing. The current that degrades antenna characteristics is reduced, and therefore the characteristics are improved.

50 Claims, 17 Drawing Sheets

F I G. 3
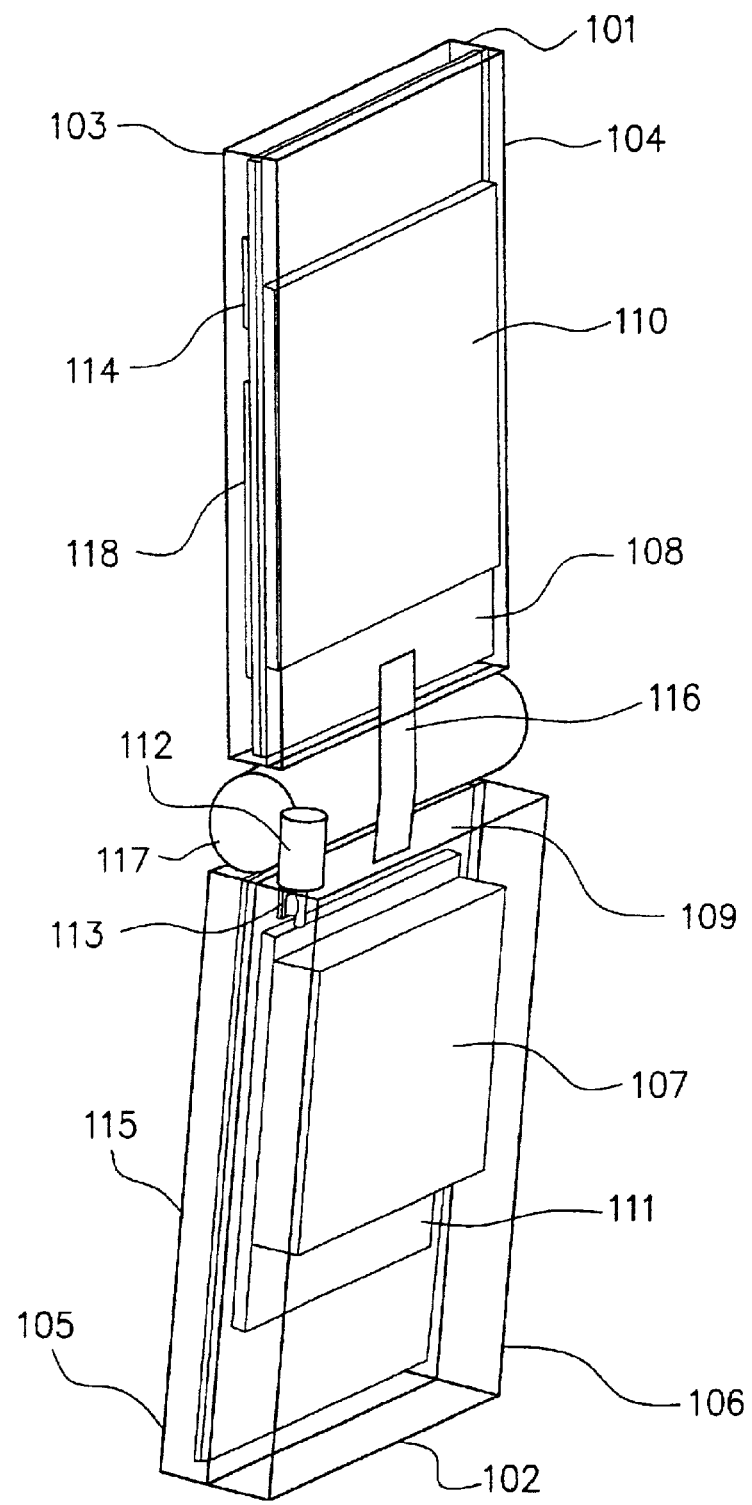

F I G. 8
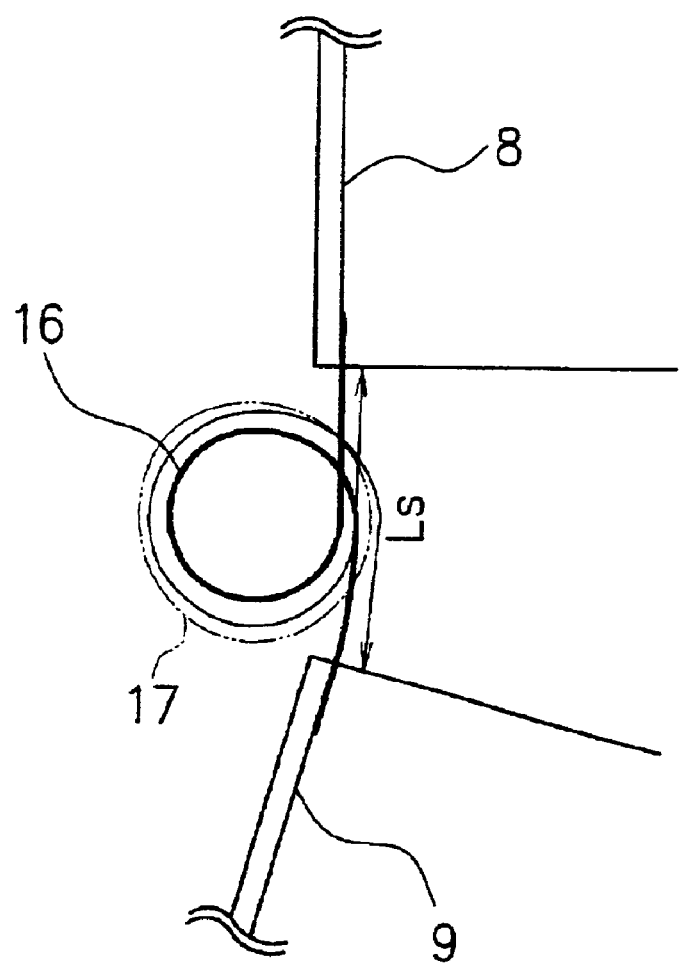

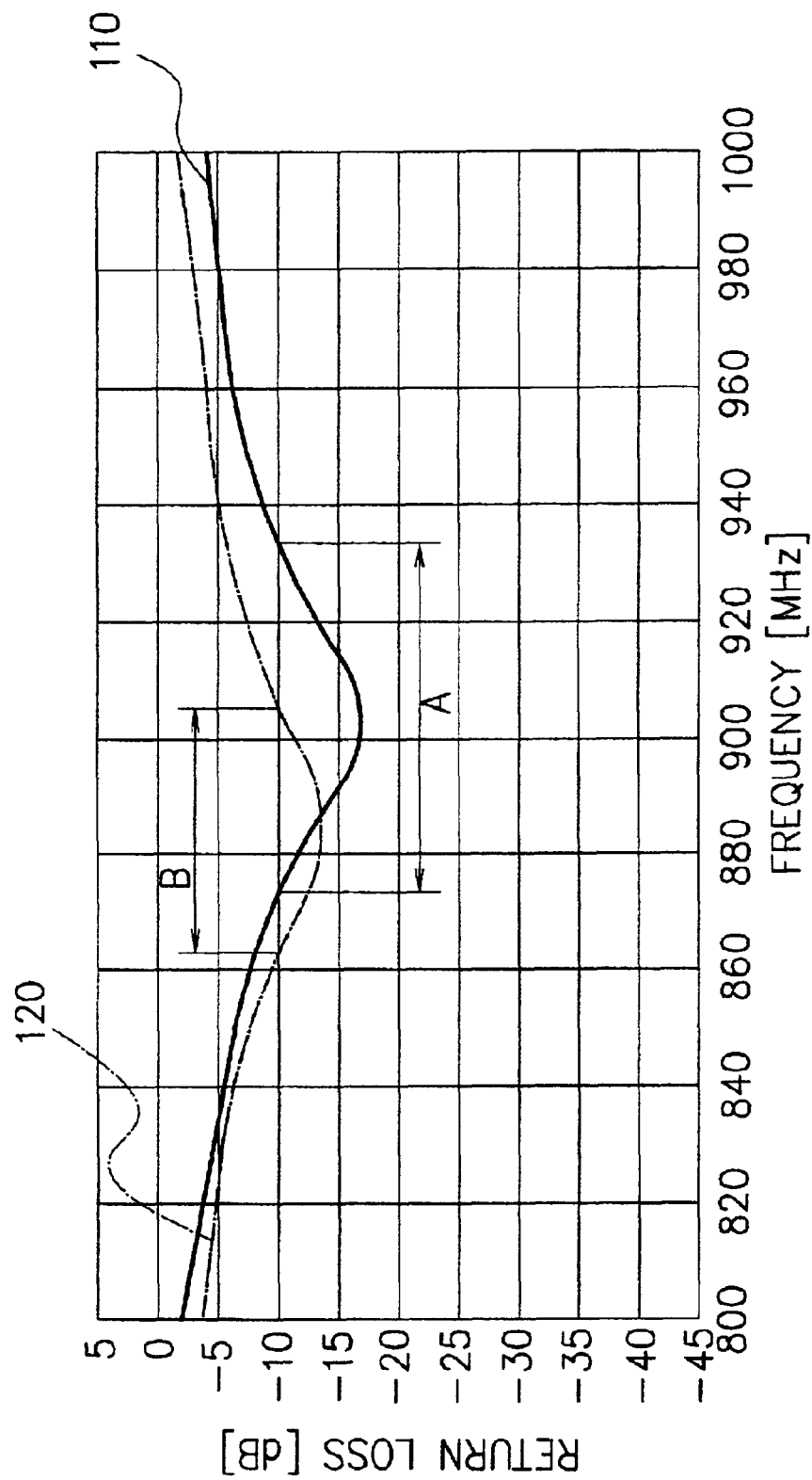
F I G. 11

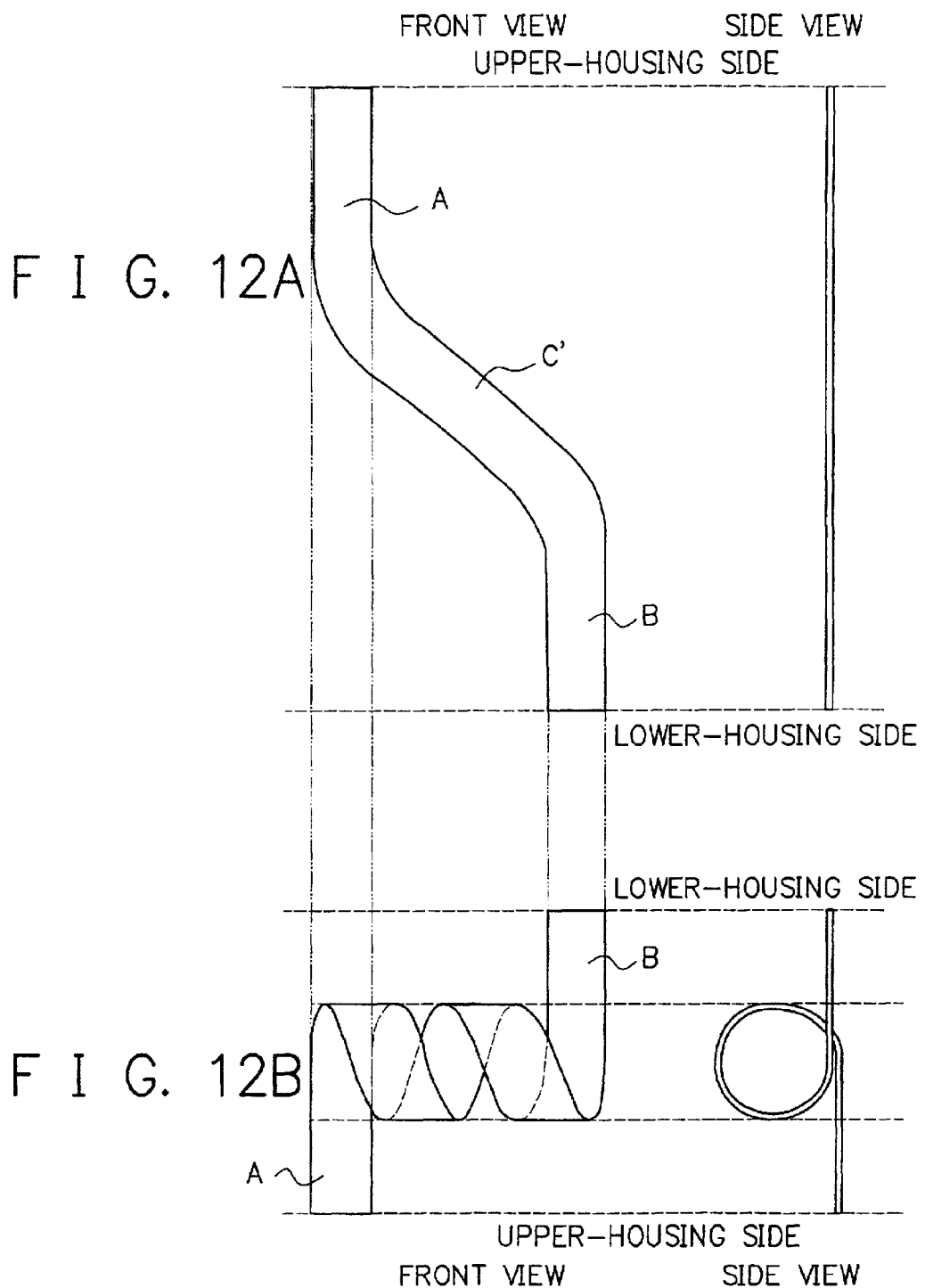

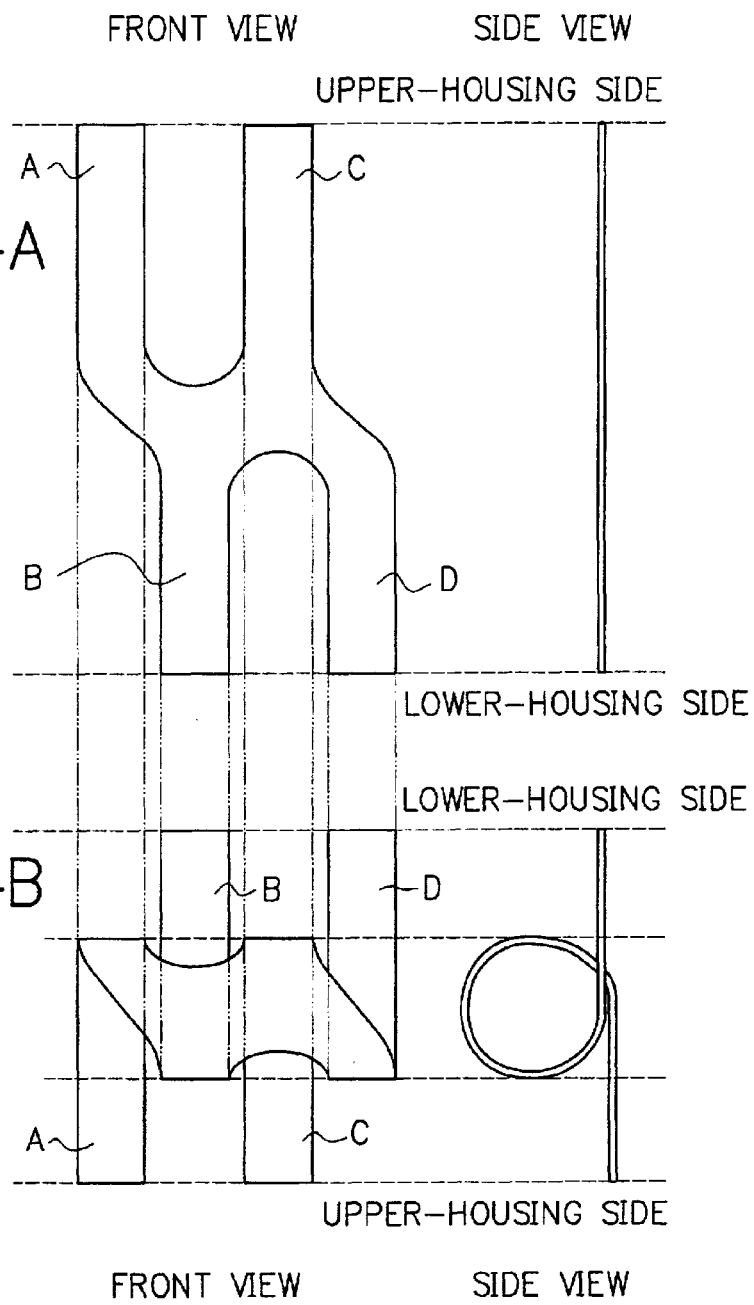

FOLDABLE PORTABLE RADIO TERMINAL

BACKGROUND OF THE INVENTION

This invention relates to a foldable portable radio terminal with a hinge. More specifically, this invention relates to a foldable portable radio terminal whose lower housing is provided with an antenna.

DESCRIPTION OF THE RELATED ART

Recently, portable terminals have come into wide use with the advancement of technology in the field mobile communications. Under such circumstances, in order to meet various demands of users, manufacturers or vendors of a portable terminal have brought a great variety of portable terminals to the market. In particular, recent technological development has enabled a portable terminal to access the Internet or the like, which has then given rise to a user's strong request for a portable terminal with a large-sized display.

In order to meet such demand, there has been proposed a foldable portable radio terminal configured by separate housings, an upper housing and a lower housing, where these two housings are connected via a hinge. Such kind of foldable portable radio terminal has enjoyed great popularity since it sufficiently meets demands of users, being provided with the following features. First of all, an operating unit and a display have respectively a large area on the terminal. The operating unit functions as an interface with a user, and the display provides a user with information by displaying characters or the like on the display. Secondly, when the portable terminal is not in use, it can be folded, thus occupying as little space as possible. Thirdly, the portable terminal may be designed so that spacing between a microphone and a receiver will be equal to that between an ear and a mouth of a user when the terminal is unfolded for use. The terminal with this spacing provides a user with a high telephone speech quality.

Conventional foldable portable radio terminals will be explained below. Structure of a foldable portable radio terminal according to a first conventional terminal is shown in FIG. 1. As shown in FIG. 1, a prior art foldable portable radio terminal comprises an upper housing 101 and a lower housing 102. The upper housing 101 includes an upper-housing front panel 103 and an upper-housing rear panel 104. The lower housing 102 includes a lower-housing front panel 105 and a lower-housing rear panel 106.

In a vessel formed in the upper housing 101 by the upper-housing front panel 103 and the upper-housing rear panel 104, there are contained an upper-housing circuit 108, a control unit 110, a receiver 114 and a display 118. In addition, an antenna 112 and a feeding conductor 113 for supplying power to the antenna 112 are contained in the vessel.

Furthermore, a vessel in the lower housing 102, formed by the lower-housing front panel 105 and the lower-housing rear panel 106, there are contained a battery 107, a lower-housing circuit 109, a radio unit 111 and a key operating unit 115. The upper housing 101 and the lower housing 102 are connected via a hinge 117, around which these two housings can be revolved or rotated. With this construction, the portable terminal can be folded as well as unfolded by a user.

The antenna 112 provided within the upper housing 101 is connected to the radio unit 111 via a coaxial cable 119. The power supplied to the upper-housing circuit 108 from the battery 107 is fed to the antenna 112 through the feeding conductor 113.

In such a foldable portable radio terminal, the battery 107 is included in the lower housing 102 in consideration of weight balance when the terminal is held by a user, and of stability when it is put on the desk. Furthermore, the radio unit 111 including a transmitter which consumes a large current is located in the lower housing 102, since the radio unit is desirable to be located adjacently to the battery 107 in order to reduce a voltage drop caused by each printed circuit pattern connected to the power source. It is also preferable that the radio unit 111 is included in the lower housing 102 so as to provide a thinner foldable portable radio terminal.

Still further, the upper-housing circuit 108 and the lower-housing circuit 109 are electrically connected by a connection unit 116 having plural pairs of conductors, thus transmitting/receiving signals through the connection unit 116. The battery 107 is connected to the lower-housing circuit 109, thus supplying power to each unit through the lower-housing circuit 109.

The connection unit 116 is composed of a flexible printed wiring board (i.e., a flexible board) in order to prevent damage to a conductor when the housing moves or rotates around the hinge 117. Additionally, the upper-housing front panel 103 and the lower-housing front panel 105 according to the conventional foldable portable radio terminal are made of metal so as to secure its strength.

The antenna 112 is placed at the upper part of the upper-housing rear panel 104 and being made in contact with the feeding conductor 113 arranged in the upper-housing circuit 108. As shown in FIG. 1, the feeding conductor 113 receives power from the battery 107 through the upper-housing circuit 108, the connection unit 116 and the lower-housing circuit 109. The coaxial cable 119 which provides connection between the radio unit 111 and the antenna 112 is fixed at a designated place with a cable clamp (not shown).

FIG. 2 shows return loss characteristics of the conventional foldable portable radio terminal with the above-mentioned structure when the antenna 112 is extended. A return loss mentioned in the present invention is a comparison result between two current levels, a level originally inputted into the antenna and a level reflected therefrom. More specifically, the return loss indicates a ratio of a signal sent from the radio unit to the antenna (that is, a signal sent from an impedance matching circuit located between the radio unit and the antenna, to the antenna), to a signal reflected from the antenna.

The following are dimensions of a foldable portable radio terminal experimentally used for measuring the return loss characteristics shown in FIG. 2. The upper-housing circuit 108 and the lower-housing circuit 109 respectively have the size of approx. 75 mm.×40 mm, the upper housing 101 and the lower housing 102 are approx. 90 mm.×45 mm, and the spacing between the upper-housing circuit 108 and the lower-housing circuit 109 is approx. 15 mm.

In the above-mentioned structure, the antenna 112 has a helical antenna inside its casing. The helical antenna has the following measurement; approx. 6 mm in diameter and approx. 15 mm in height. The helical antenna provides an impedance matching with a feeding line using an impedance matching circuit (not shown) provided between the feeding conductor 113 and the radio unit 111.

It is understood from the experimental result shown in FIG. 2 that the first conventional foldable portable radio terminal has a bandwidth of approx. 40 MHz when a return loss is −10 dB.

However, the first conventional terminal shown in FIG. 1 has a structural problem that the coaxial cable 119 is required in order to make an electrical connection between the antenna 112 and the radio unit 111. This leads to an inadequate assembling efficiency in a manufacturing process, compared with efficiency in assembling a no-foldable type portable radio terminal.

In order to solve the above-mentioned problem, a second conventional foldable portable radio terminal is provided with structure where an antenna 112 is located in a lower housing as shown in FIG. 3. As apparent from FIG. 3, the antenna 112 and a feeding conductor 113 are included in a lower housing 102, thus eliminating the above-mentioned coaxial cable 119 connecting the antenna 112 and a radio unit 111. It is noted that the remaining structures of the second conventional terminal are the same as those of the first terminal shown in FIG. 1. However, the positioning of the antenna in the lower housing 102 has changed the impedance with respect to a circuit, therefore an impedance matching circuit provided between the antenna 112 and the radio unit 111 requires readjustment.

FIG. 4 shows return loss characteristics when the antenna 112 is positioned in the lower housing 102. The second conventional foldable portable radio terminal uses the same antenna 112 (including a helical antenna) as that of the first conventional terminal which has been used for measuring return loss characteristics shown in FIG. 2. Despite of this, the second conventional terminal has a problem that the bandwidth at which the antenna can transmit/receive signals becomes extremely narrow. This problem is obvious from the following comparison. Regarding a return loss of −10 dB, a bandwidth at that loss is approx. 40 MHz as shown in FIG. 2, however, it is approx. 30 MHz as shown in FIG. 4.

This is because a current is generated on a conductor part (a front panel of the housing which is made of metal and opposing to the antenna) of the upper-housing circuit 108 or on a portion neighboring the antenna 112. The current thus generated flows in the opposite direction to that in the antenna, and impedes output of an electromagnetic wave from the antenna. The present invention has been made in view of the above-mentioned problems and shortcomings.

SUMMARY OF THE INVENTION

According to the present invention, there is provided a foldable portable radio terminal with an antenna arranged in the lower housing, whereby eliminating a coaxial cable conventionally used for connecting the antenna and a radio unit and improving antenna characteristics.

In order to attain the above-mentioned object, according to a first aspect of the present invention, there is provided a foldable portable radio terminal having a first housing for including a first circuit unit inside and a second housing for including a second circuit unit inside, said first and second housings are connected through the intermediary of a hinge so as to rotate around said hinge, said terminal comprising: power-supply means for supplying power to said first and second circuit units; and connecting means for electrically connecting said first and second circuit units, wherein said connecting means having a prescribed shape and length, so that said connecting means generates an inductance which serves as a load to a high-frequency current.

The connecting means according to the foldable portable radio terminal of the present invention is a flexible board having conductors for generating said inductance.

Prescribed shape is a shape where said connecting means partially has a spiral structure with one or more of turns, and said prescribed length is a length capable of connecting said first and second circuit units with said spiral structure being maintained.

Preferably, said connecting means, when it is expanded, is S-shaped including first, second and third zonal areas, said first zonal area corresponding to one end portion of said connecting means and being connected to said first circuit unit, said second zonal area corresponding to another end portion of said connecting means and being connected to said second circuit unit, and said third zonal area corresponding to an area which lies intermediary of said first and second zonal areas, and wherein said third zonal area being associated with a portion where said spiral structure is formed and having a length for avoiding interconnection between said first and second zonal areas when said spiral structure is being maintained.

According to the present invention, said connecting means is arranged to go through said hinge, and is housed inside said hinge at a portion where said spiral structure is formed.

It is preferable that the connecting means, when it is expanded, is tuning-fork shaped including first, second and third zonal areas, said first zonal area corresponding to one end portion of one prong and being connected to said first circuit unit, said second zonal area corresponding to another end portion of another prong and being connected to said first circuit unit, and said third zonal area corresponding to an end portion of a stem and being connected to said second circuit unit, wherein a portion where said prongs and stem merge and its vicinity is rolled up to form said coil structure, and wherein said first, second and third zonal areas are arranged apart for avoiding interconnection when said coil structure is being maintained.

It is preferable that the connecting means, when it is expanded, has a shape including first, second and third zonal areas, said first zonal area corresponding to one end portion of said connecting means and being connected to said first circuit unit, said second zonal area corresponding to another end portion of said connecting means and being connected to said second circuit unit, and said third zonal area corresponding to a portion which lies intermediary of said first and second zonal areas and takes a crank shape.

According to another aspect of the present invention, the antenna unit and radio unit are connected to said second circuit unit within said second housing, and said first circuit unit has a length of approximately half of said second circuit unit.

Preferably, the first housing is made of metal and said second housing is made of insulator, and said first housing is electrically connected to said first circuit unit. Furthermore, the first housing comprising a front panel and a rear panel has configurations either where said front panel being made of metal and said rear panel being made of insulator or where said front panel being made of insulator and said rear panel being made of metal, said panels made of metal being electrically connected to said first circuit unit.

Preferably, the first housing is made of insulator and said second housing is made of metal, and said second housing is electrically connected to said second circuit unit. Further, the second housing comprising a front panel and a rear panel has configurations either where said front panel being made of metal and said rear panel being made of insulator or where said front panel being made of insulator and said rear panel being made of metal, said panels made of metal being electrically connected to said second circuit unit.

BRIEF DESCRIPTION OF THE DRAWINGS

The objects and features of the present invention will become more apparent from the consideration of the following detailed description taken in conjunction with the accompanying drawings in which:

FIG. 3 is an oblique perspective view of a second conventional foldable portable radio terminal;

FIG. 8 is an enlarged side view of the connection unit according to the first embodiment;

FIG. 11 is a chart showing antenna characteristics obtained by a foldable portable radio terminal according to the first embodiment of the present invention;

FIGS. 12A and 12B show a second example of a connection unit according to the first embodiment of the present invention;

FIGS. 14A and 14B depict a fourth example of a connection unit according to the first embodiment;

DESCRIPTION OF THE PREFERRED EMBODIMENTS

Description will be given of preferred embodiments of the present invention with reference to accompanying drawings.

A foldable portable radio terminal of the present invention is characterized by comprising an upper housing and a lower housing. The lower housing is provided with at least a battery and a radio unit, and the upper housing has an arbitrary circuit inside. More specifically, an antenna is included in the lower housing, and a wiring length associated with a connection unit connecting an upper-housing circuit and a lower-housing circuit is longer than a distance or spacing between the upper-housing circuit and the lower-housing circuit.

With this construction, a coaxial cable, which is conventionally required for connecting an antenna and a radio unit, is not included any more in the foldable portable radio terminal of the present invention. As a result, efficiency with respect to assembling the terminal in the production line is improved.

Furthermore, in the foldable portable radio terminal of the present invention, since a wiring length of a connection unit is longer than the spacing between the upper-housing circuit and the lower-housing circuit, it is therefore possible to alleviate degradation in antenna characteristics, which is caused by conducting parts in an upper-housing circuit or the like. The alleviation is accomplished by arranging the impedance between the upper-housing circuit and the lower-housing circuit, for reducing quantity of current oscillating between the upper housing and the lower housing.

In the foldable portable radio terminal of the present invention, a part of or the whole of an upper housing and a lower housing is selectively made of metal (diecast) or mold (insulator). If the entire terminal is made of mold, the housing causes no effect on an antenna and preferable antenna characteristics can be realized. However, taking into consideration the strength of the entire terminal, it is desirable to construct the housing with metal.

If both an upper housing and a lower housing are made of metal and connected each other through the intermediary of a hinge, a current generated in the metal oscillates between the housing and a circuit in the housing through the hinge. The oscillating current has not necessarily the same phase as that generated in an antenna, and in most cases, the oscillating current acts to degrade antenna characteristics.

It is a feature of the foldable portable radio terminal of the present invention that, if an upper housing and a lower housing are made of metal, the terminal has a structure where the upper housing is not electrically connected to the lower housing when the foldable portable radio terminal is unfolded.

First Embodiment

In consideration of the above-mentioned feature and structure, a description is given of a first embodiment of the present invention with reference to the accompanying drawings.

Figure 5:
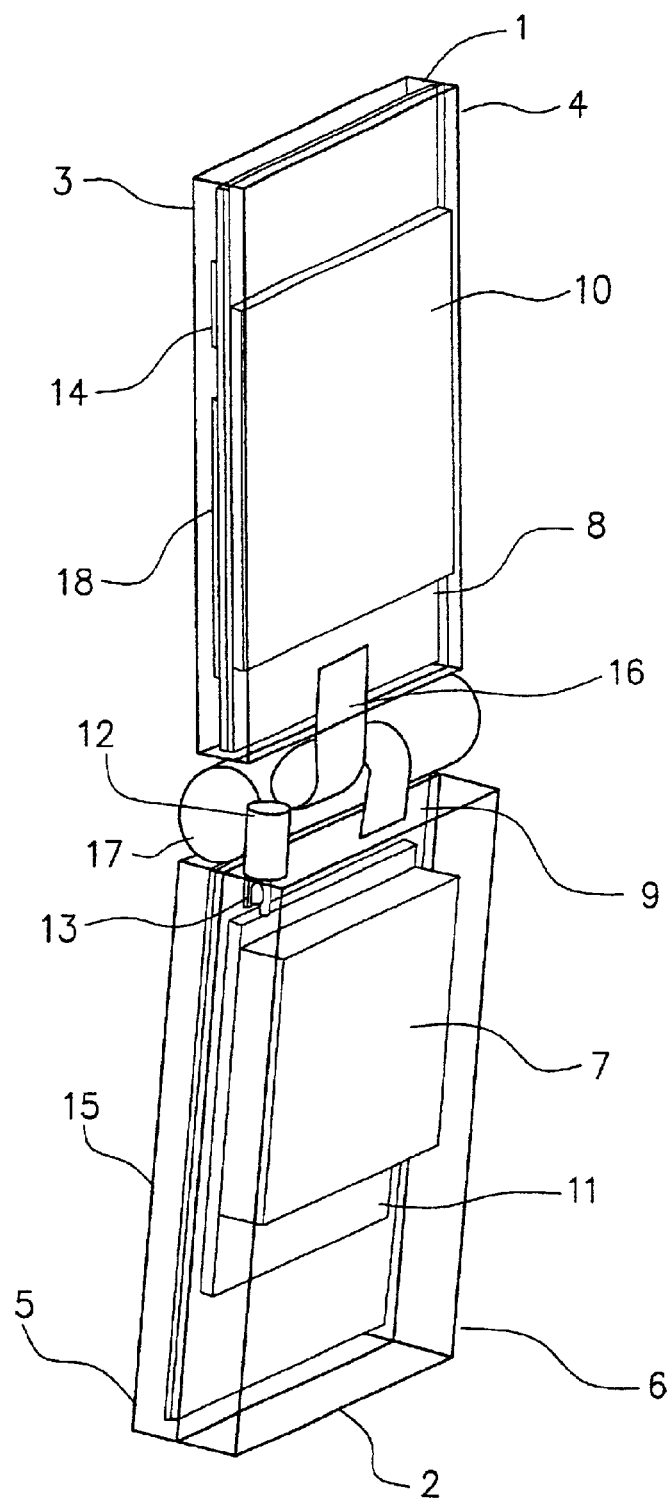
FIG. 5 is an oblique perspective view for showing structure of a foldable portable radio terminal according to a first embodiment of the present invention.

FIG. 5 is an oblique perspective view showing a structure of a foldable portable radio terminal according to a first embodiment of the present invention. As shown in FIG. 5, the foldable portable radio terminal comprises an upper housing 1 and a lower housing 2, which are connected to each other via a hinge 17.

The upper housing 1 comprises an upper-housing front panel 3 and an upper-housing rear panel 4. Within a vessel constructed by the upper-housing front panel 3 and the rear panel 4, there are provided an upper-housing circuit 8, a controller 10, a receiver 14 and a display unit 18.

Similar to the upper housing 1, the lower housing 2 comprises a lower-housing front panel 5 and a lower-housing rear panel 6. Within a vessel constructed by the lower-housing front panel 5 and the lower-housing rear panel 6, there are provided a battery 7, a lower-housing circuit 9, a radio unit 11, a feeding conductor 13 and a key operating unit 15. The lower housing 2 is provided with an antenna 12 in proximity to the hinge 17 which is provided between the upper housing 1 and the lower housing 2. The hinge 17 is a joint for connecting the upper housing I and the lower housing 2, and makes the upper housing 1 and the lower housing 2 rotate around its central axis.

The antenna 12 located in proximity to the hinge 17 is provided in the lower housing 2 on an upper-housing side. The antenna 12 is connected to the radio unit 11 through the feeding conductor 13. In the conventional terminal, an antenna is provided in an upper housing and connected to a radio unit through a coaxial cable. On the contrary, the foldable portable radio terminal of the first embodiment requires no coaxial cable for connecting the radio unit 11 and the antenna 12. The antenna 12 is not directly connected to the battery 7, but is connected to the battery 7 via the feeding conductor 13, an impedance matching circuit (not shown) and the lower-housing circuit 9.

It is noted that the impedance matching circuit is provided for preventing reflection of signals between the antenna 12 and the radio unit 11. For that purpose, the circuit equalizes the input impedance looking at the antenna 12 with the output impedance of the radio unit 11 including the impedance matching circuit.

In the above-described construction, the radio unit 11 and the battery 7 are included in the lower housing 2, a wire length for connecting the battery 7 and the radio unit 11 may therefore be shorter than that of the conventional one. This brings about advantages, in addition to the above-mentioned simplification in structure, that even if a large current flows into the radio unit 11 when transmitting signals, a drop in voltage supplied to other circuits can be prevented.

The battery 7 supplies power to the lower-housing circuit 9, and power is supplied to each circuit through the circuit 9. To the upper-housing circuit 8 included in the upper housing 1, power is supplied from the lower-housing circuit 9 through an upper/lower circuit connection unit 16 included or housed in the hinge 17. The radio unit 11 included in the lower housing 2 comprises circuits necessary for transmitting/receiving signals. The radio unit 11 executes as required a processing such as a spectrum-spreading modulation for information to be transmitted. The key operating unit 15, exposed on the surface of the lower housing 2 and projecting from the lower-housing front panel 5, serves as an interface between a user and the controller 10.

The controller 10 included in the upper housing 1 controls each circuit included in the upper housing 1 and the lower housing 2. The receiver 14 functions as a voice input/output interface for a user. The display unit 18 is exposed on the surface of the upper housing 1 by projecting from the upper-housing front panel 3, and provides a user with a variety of visual information. The controller 10, the receiver 14 and the display unit 18 receive power through the upper-housing circuit 8.

The upper-housing circuit 8 and the lower-housing circuit 9 are connected via the connection unit 16 included in the hinge 17. According to the first embodiment, the connection unit 16 is a flexible printed wiring board, so that it changes its shape according to rotation of the housings around the hinge 17 (that is, when folding or unfolding the foldable portable radio terminal). The connection unit 16 thus acts to maintain connection between the upper-housing circuit 8 and the lower-housing circuit 9.

Figure 6A:
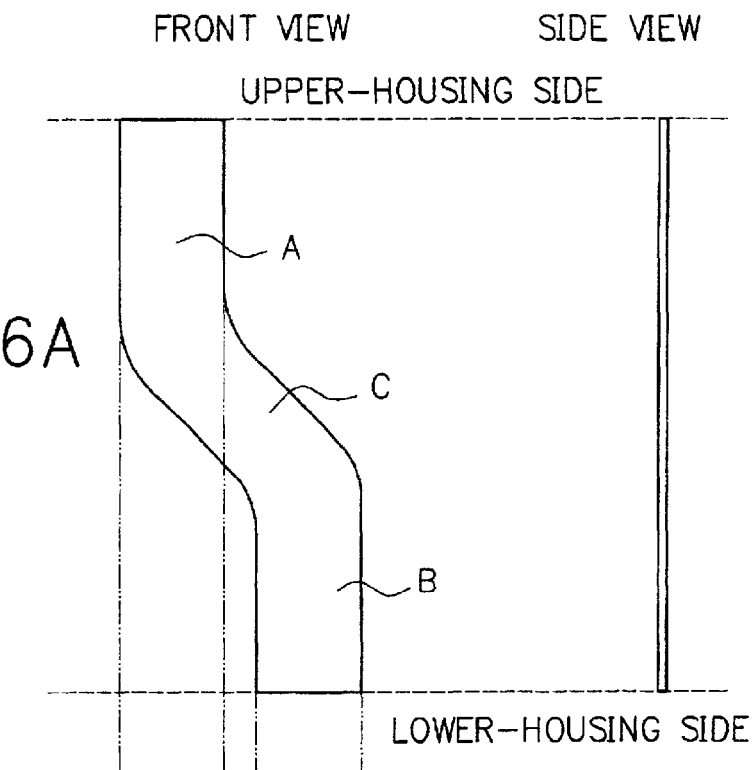
FIGS. 6A and 6B show a first example of a connection unit according to the first embodiment.
Figure 6B:
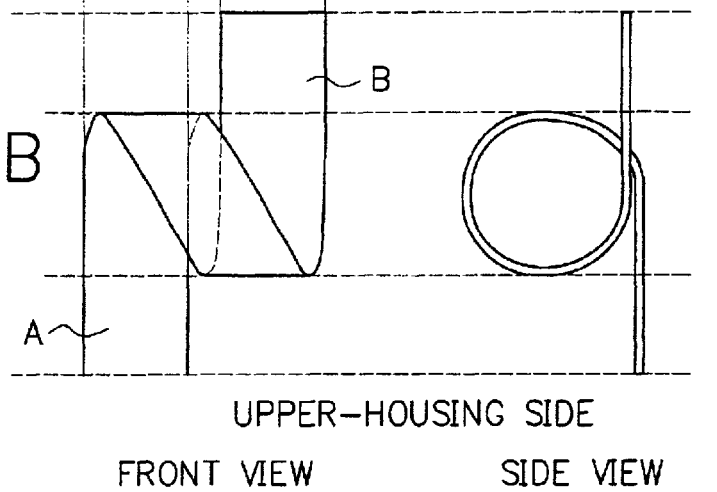

Structure of the Connection Unit:

Now, a structure of the connection unit 16 will be explained. In the present invention, in order to prevent generation of an opposing current which acts as an obstacle to an antenna current, the connection unit 16 functions as a load to the opposing current. FIGS. 6A and 6B show a structure of the connection unit 16 according to the present embodiment. As shown in FIG. 6A, the connection unit 16 is an S-shaped flat cable with a plurality of conductors. The connection unit 16 is provided with two zonal areas A and B. The area A is for connection to the upper-housing circuit 8, and the area B to the lower-housing circuit 9. There is also provided a zonal area C in the central part of the connection unit 16, which is oblique to a line connecting between the upper-housing circuit 8 and the lower-housing circuit 9, so that the areas A and B keep in parallel to each other when the connection unit 16 is rolled up as shown in FIG. 6B.

The connection unit 16 according to the present embodiment is incorporated into the foldable portable radio terminal in a shape as shown in FIG. 6B. The connection unit 16, which is a flexible printed wiring board, is so configured that any part of the board does not contact each other when it is rolled up to have a spiral portion as shown in FIG. 6B. This is because there is a possibility that the flexible printed wiring board can be damaged if portions including its sides contact with each other when the connection unit 16 is moved in accordance with folding or unfolding of the radio terminal. For that reason, the connection unit 16 is constructed in such a way that the areas A and B do not overlap each other.

Figure 7:
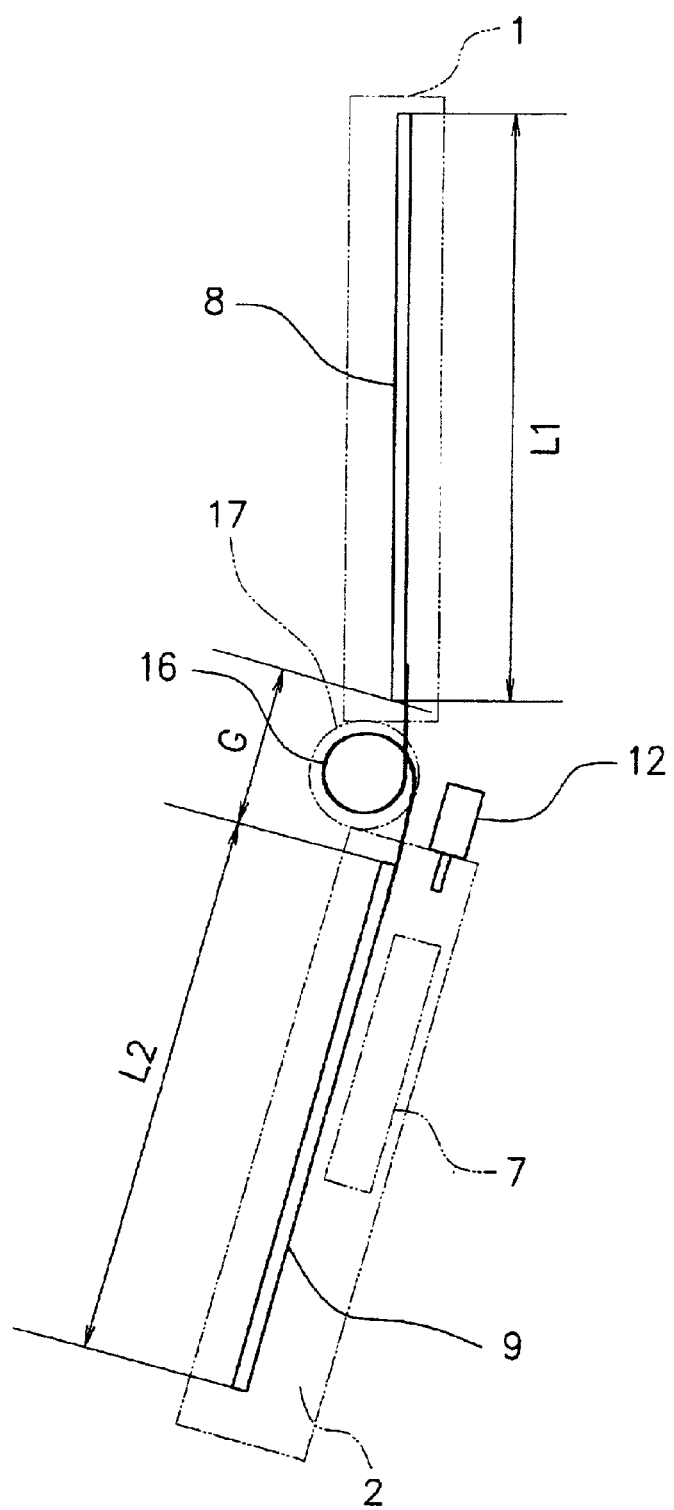
FIG. 7 is a perspective side view of the foldable portable radio terminal according to the first embodiment.

Turning now to FIG. 7 and FIG. 8, the connection unit 16 will be explained in further detail. FIG. 7 is a perspective side view of the foldable portable radio terminal where the upper-housing circuit 8 and the lower-housing circuit 9 are connected via the hinge 17 which includes the connection unit 16 inside. FIG. 8 is an enlarged side view of the connection unit 16.

Referring to FIG. 7, L1 is a length of the upper-housing circuit 8, L2, of the lower-housing circuit 9 and G, the spacing between the upper-housing circuit 8 and the lower-housing circuit 9. As shown in FIG. 8, the connection unit 16 has a total length of Ls as indicated by a curved line with arrows on both ends, when, for example, the foldable portable radio terminal is unfolded. From FIG. 7 and FIG. 8, it is understood that the length Ls is longer than the spacing G, which is realized by partially rolling up the connection unit 16 in spiral inside the hinge 17.

With the above-mentioned structure, a current path through which a current flows from the upper housing 1 to the lower-housing circuit 9, or from the lower housing 2 to the upper-housing circuit 8, becomes longer. In this way, inductance to a high-frequency current is generated between the upper and lower-housing circuits, thus reducing the amount of a high-frequency obstacle current.

Figure 9:
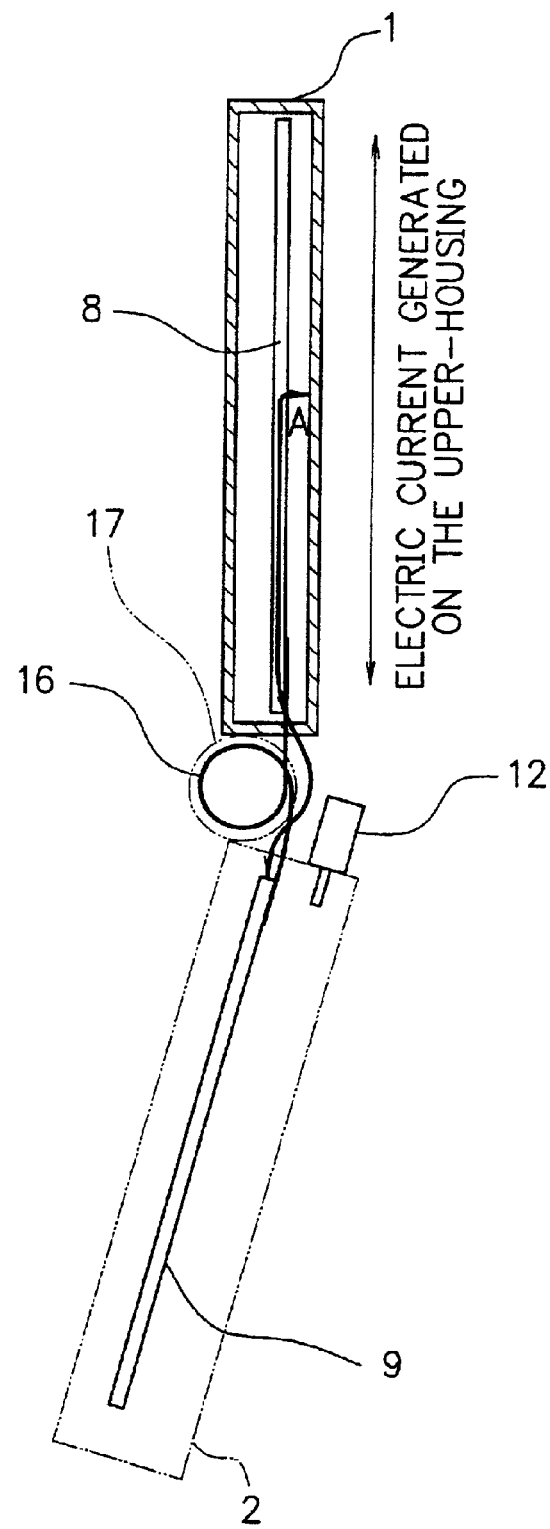
FIG. 9 visually shows a flow of a current generated on an upper housing.

Next, operation and behavior of a current generated in the upper housing 1 or the lower housing 2, which are made of metal (diecast), will be explained by referring to drawings. FIG. 9 visually shows a current generated in the upper housing 1, which flows into the lower-housing circuit 9 through the connection unit 16. As shown in FIG. 9, the upper-housing rear panel 4 of the upper housing 1 is electrically connected to the upper-housing circuit 8 at the point A. High-frequency current generated in the upper housing 1 flows into a ground plane (earth) of the upper-housing circuit 8 through the point A as indicated by a bold line.

If the upper housing 1 is made of metal and exposed to an electromagnetic wave coming from the external of the housing, a high-frequency current is generated in the housing. The current thus generated flows in an arbitrary direction, however, for the clarity of the explanation, only a current flowing in the direction from the center of the upper housing 1 to the center of the lower housing 2 will be explained.

Figure 10A:
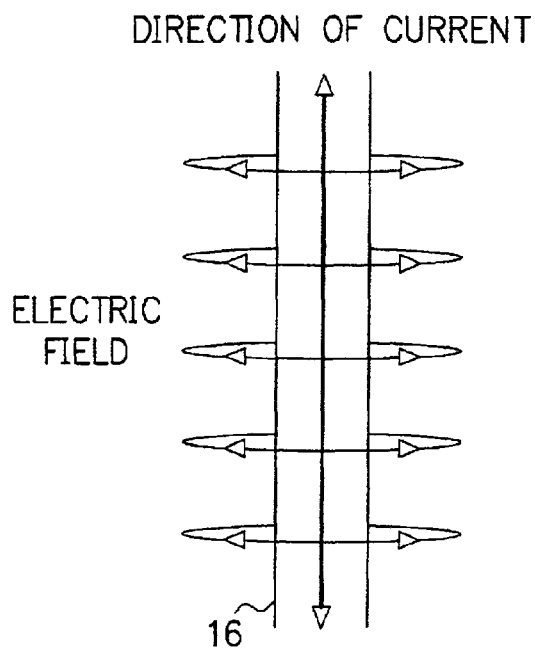
FIGS. 10A, 10B, 10C and 10D are side views and top views of the connection unit and the antenna for showing a current and a electric field generated in the connection unit and the antenna.
Figure 10C:
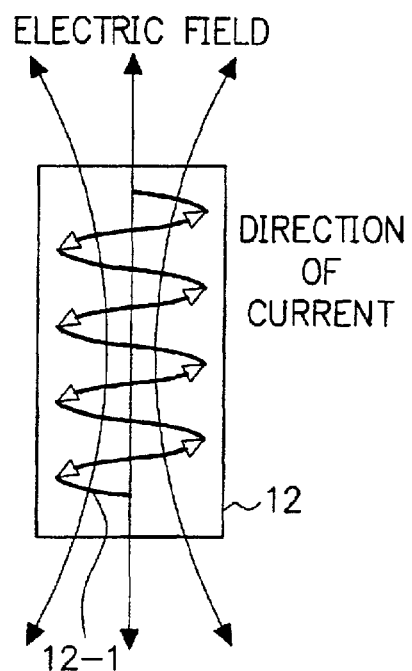
Figure 10B:
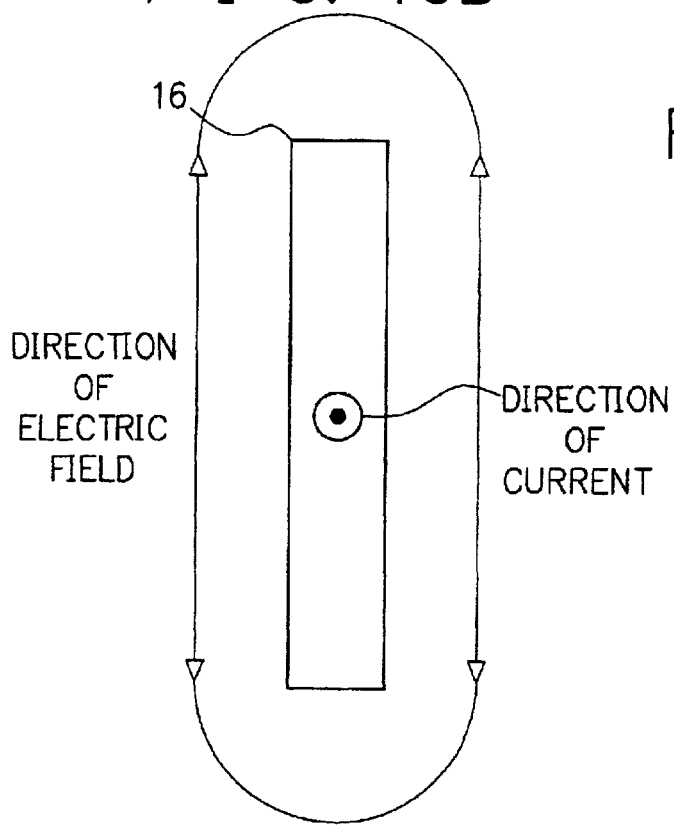
Figure 10D:
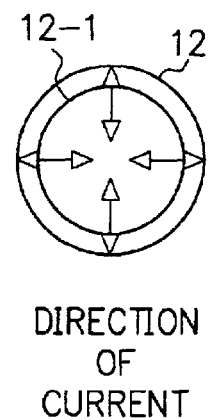

FIGS. 10A and 10B respectively show a side view and a top view of the connection unit 16, and FIGS. 10C and 10D are a side view and a top view of the antenna 12, respectively. These figures show a current and an electric field generated in the connection unit and the antenna, which is caused by an incoming electromagnetic wave. Electromagnetic wave coming to the foldable portable radio terminal has an arbitrary phase, therefore a high-frequency current generated in the upper housing 1 (that is, the upper-housing rear panel 4) also has an arbitrary phase. This means that the phase is not necessarily the same as that of an electromagnetic wave transmitted from and received by the antenna 12. Accordingly, an electric field generated according to the high-frequency current in the upper housing 1 impedes a current generation in the antenna 12. This degrades characteristics (performance) of the antenna. Such operation can be seen not only in the antenna 12 including a helical antenna 12-1 as shown in FIGS. 10C and 10D but in an antenna with a different structure.

In order to solve the above-mentioned problem, in the foldable portable radio terminal according to the present embodiment, the connection unit 16 is configured to act as an inductance by making the length (Ls) of the connection unit 16 longer than the spacing (G) between the upper-housing circuit 8 and the lower-housing circuit 9. At the same time, the connection unit 16 serves as a load impedance to a high-frequency current oscillating between the upper housing 1 and the lower-housing circuit 9 (or between the lower housing 2 and the upper-housing circuit 8). In addition, the impedance is further increased by rolling up the connection unit 16 in spiral when the unit is incorporated inside the hinge 17 so that it serves as a coil.

With the above-mentioned structure, an electric field set up by a current flowing between the housing (the upper housing 1 and/or the lower housing 2) and the circuit (the upper-housing circuit 8 and/or the lower-housing circuit 9) becomes less effective to the antenna 12. This enables the antenna to have a broader bandwidth, over which the antenna can transmit/receive signals. It is understood reduction in current, which flows between the housing and the circuit and prevents generation of current in the antenna by an incoming electromagnetic wave, is caused by the connection unit 16 which is partially in spiral and with the length of Ls.

From the above description, it is obvious that a load impedance obtained by arranging a coil-shaped connection unit 16 between the housing and the circuit reduces a high-frequency current which oscillates between the upper housing 1 and the lower-housing circuit 9 (or between the lower housing 2 and the upper-housing circuit 8). It is also obvious that an electric field coming into the antenna 12 deteriorates or degrades characteristics of the antenna 12. Relationships between the spacing G, the length Ls of the connection unit 16 and the antenna characteristics (a return loss) will be explained in detail below with reference to a chart.

In the above-mentioned structure, a part or the entire of the housing is made of metal (diecast). That is, any one of the upper-housing front panel 3, the upper-housing rear panel 4, the lower-housing front panel 5 and the lower-housing rear panel 6 is made of metal. If the upper housing 1 and the lower housing 2 are made of a conductive material (for example, metal or diecast), and if the upper housing 1 and the lower housing 2 contact each other when the foldable portable radio terminal is unfolded, oscillation of a current begins through the contact point(s). This means a coil-shaped connection unit 16 fails to produce satisfactory effect. Therefore, it is necessary for the upper housing 1 and the lower housing 2 of the foldable portable radio terminal not to contact electrically each other, provided that the upper housing 1 and the lower housing 2 are made of a conductive material.

In order to avoid the above-mentioned problem caused by the contact, it is also possible to use insulator (mold) for either the upper housing 1 or the second housing 2. However, in general, mold is inferior to metal in terms of durability, therefore mold is not suitable for an external wall of the terminal. Considering durability, it becomes necessary to construct part of the housing with a durable metal. It goes without saying that any combination of materials including metal and insulator is to be applied to the present invention without departing from the spirit of the invention.

The foldable portable radio terminal according to the present embodiment has the radio unit 11 and the antenna 12 in the same housing (the lower housing 2). This construction eliminates a coaxial cable required for connecting the radio unit and the antenna in the conventional terminal and increases efficiency with respect to assembling in the production line. In addition, a high-frequency current generated between housing and circuit is reduced, which makes it possible to avoid generation of an electric field that deteriorates antenna characteristics of the antenna 12. At the same time, the foldable portable radio terminal can transmit/receive signals over a broad bandwidth.

Antenna characteristics will be explained below referring to a drawing. FIG. 11 is a chart showing antenna characteristics obtained by measuring a foldable portable radio terminal according to the first embodiment of the present invention. Physical dimensions of the foldable portable radio terminal used for the measurement are as follows. The upper-housing circuit 8 is approx. 75 mm (L1 of FIG. 7)×40 mm, and the lower circuit 9 is approx. 75 mm (L2 of FIG. 7)×40 mm. Metallic part in the lower housing 2 is approx. 90 mm×45 mm, and a spacing (G) between the upper-housing circuit 8 and the lower-housing circuit 9 is approx. 15 mm.

The lower-housing front panel 5 is made of metal and the remaining portions are made of mold, where the lower-housing circuit 9 is grounded at four points. The connection unit 16 has a length (Ls) of approx. 40 mm. The unit is rolled up to be in partially spiral with one turn, which is included in the hinge 17.

FIG. 11 shows antenna characteristics, especially return loss characteristics of a foldable portable radio terminal with the above-mentioned structure. Return loss characteristics are obtained by measuring the degree of an electric power reflected from the antenna 12 to the radio unit 11 when the power is inputted into the antenna 12. If return loss characteristics show a good result, it indicates that the electric power inputted from the radio unit 11 to the antenna 12 is outputted from the antenna 12 as a radio wave without any reflection.

In FIG. 11, the abscissa indicates a frequency band wherein scanning is executed for the antenna 12. The ordinate indicates ratio of signals reflected from the antenna 12 (a return loss in dB). A solid line 110 of FIG. 11 shows return loss characteristics of the terminal according to the first embodiment of the present invention, while a chain double-dashed line 120 shows characteristics according to the conventional terminal. Comparing the two curves, the return loss characteristics of the present invention show a desirable value over a wide frequency range as indicated by a range A in FIG. 11, where the characteristics have a peak of loss at the center of the frequency band. This means that the foldable portable radio terminal according to the present invention has antenna characteristics which are less deteriorated and have a broader bandwidth, compared with conventional characteristics as indicated by a range B in the chart.

According to the first embodiment of the present invention, the following advantages are obtained. Firstly, miniaturization in structure and improvement in an assembling efficiency are realized, since a coaxial cable becomes unnecessary for connecting a radio unit and an antenna.

Secondly, antenna characteristics are less deteriorated and a broader bandwidth are obtained, because a length of the connection unit is longer than a spacing between an upper-housing circuit and a lower-housing circuit, and the connection unit is in spiral inside a hinge.

Next, other examples of a connection unit will be described below. FIGS. 12A and 12B show a connection unit as a second example. Although the connection unit 16 according to a first example shown in FIGS. 6A and 6B is partially in spiral with one turn, the second example is partially in spiral with two turns as shown in FIG. 12B. The connection unit 16 as a second example, which is a flexible printed wiring board, is constructed so that any part of the unit does not contact each other in the same way as the first example.

With the above-mentioned structure, a length of the connection unit 16 according to a second example may be designed to be longer than that of the first example. The connection unit 16 according to a second example may also serve as a coil, which increases a load impedance to a high-frequency current. Thus, an electric current which degrades antenna characteristics is to be reduced.

It should be noted that above-described examples with respect to a connection unit have one turn or two turns in spiral, however, the number of turns is not limited to those described here.

Figure 13A:
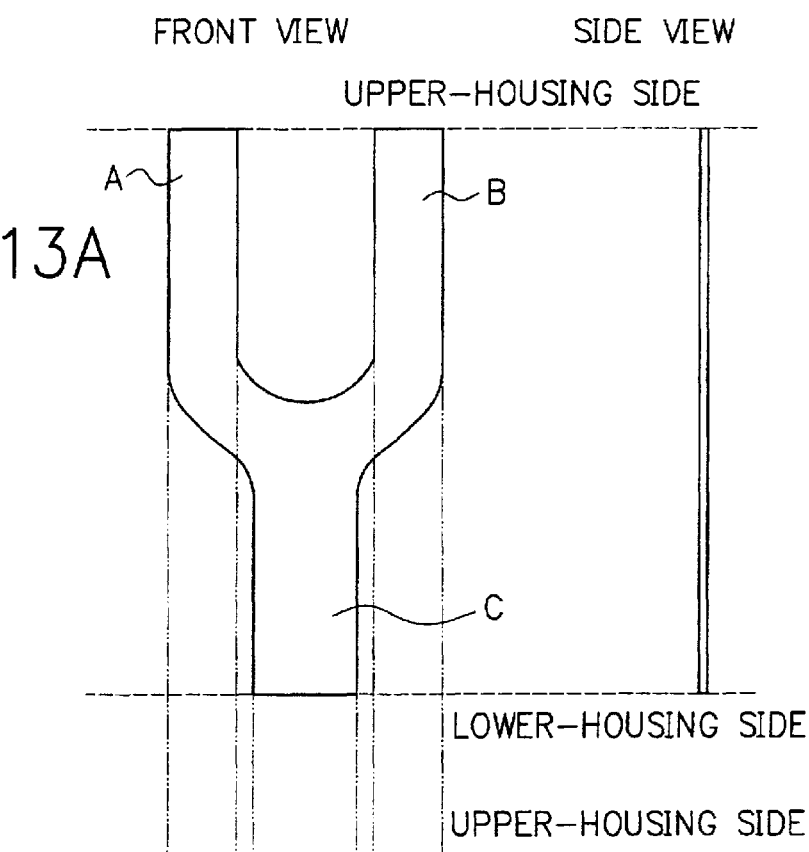
FIGS. 13A and 13B show a third example of a connection unit according to the first embodiment.
Figure 13B:
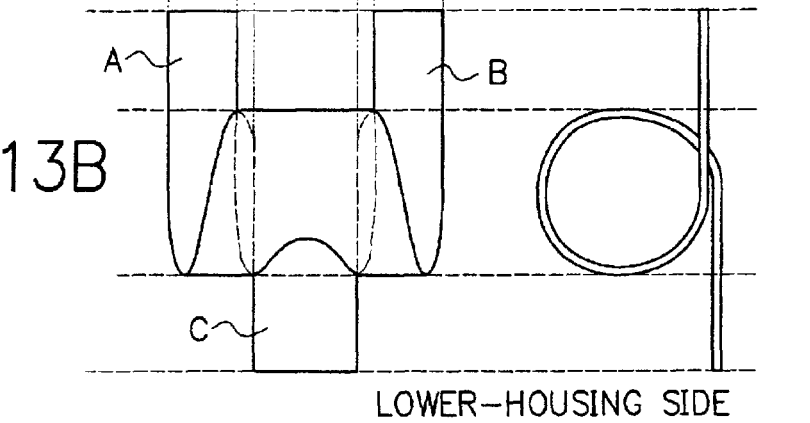

A connection unit according to a third example will be described in detail by referring to FIGS. 13A and 13B. This connection unit is Y-shaped or tuning-fork shaped when it is expanded as shown in FIG. 13A. The connection unit is a flexible printed wiring board, and configured that any part of the board does not contact each other when it is rolled up to have a ring portion as shown in FIG. 13B.

As shown in figures, the connection unit according to a third example has three zonal areas, A, B and C, one of which is corresponding to one end portion of one prong, another one is corresponding to another end portion of another prong, and the last one is corresponding to an end portion of a stem.

With the above-mentioned structure, this connection unit is physically more stable than that according to the second example with two turns of spiral rings for the reasons below. With two turns of spiral rings, the connection unit according to the second example has two zonal areas A and B, one of which is to be connected to the upper-housing circuit 8 and another one to the lower-housing circuit 9, which are widely apart each other from a line segment as an axis that is formed by combining the upper-housing circuit 8 and the lower-housing circuit 9. Furthermore, only one side of the spiral ring is suspended via a zonal area which is connected to one of the circuits, it is therefore difficult to design and assemble a spiral part which exhibits stability and repeatability.

A connection unit according to the third example has zonal areas, A and B, to be connected to the upper-housing circuit 8 and an area C, to the lower-housing circuit 9, which are close each other from a line segment as an axis formed by connecting the upper-housing circuit 8 and the lower-housing circuit 9. Additionally, since both sides and middle of a ring-shaped part are fixed to the zonal areas to be connected to each circuit, it becomes easier to design and assemble a ring-shaped part with physical stability and repeatability.

It is noted that connection sides of the connection unit according to a third example are reversible or interchangeable, that is, any side can go to the upper-housing circuit 8 or lower-housing circuit 9. Still further, although there is provided a connection unit which is Y-shaped, the unit may have a plurality of v-shaped parts such as a W-shaped structure.

A connection unit according to a fourth example, which is obtained by modifying the third example, will be explained in detail by referring to an accompanying drawing.

The connection unit according to the third example has a wiring for connecting the upper-housing circuit 8 and the lower-housing circuit 9, which is shorter in length than that of the connection unit according to the first example. Load impedance arranged between circuits is therefore not increased. In view of this, a connection unit according to the fourth example provides a unit whose length (Ls) is longer than that according to the first example. Furthermore, similar to the third example, the fourth example provides a unit having a ring-shaped portion with physical stability and repeatability.

As shown in FIGS. 14A and 14B, the fourth example of a connection unit 16 is constructed so that the unit is to be fixed to the upper-housing circuit 8 at two points, and to the lower-housing circuit 9 at two points. A total of four points, that is, zonal areas A, B, C and D shown in the figure, contribute to fixation to the circuits.

This connection unit is connected to the upper-housing circuit 8 and the lower-housing circuit 9 in an alternate fashion by four zonal areas. The connection unit is formed to have a ring-shaped part, which provides stability and repeatability and further makes a length of the connection unit substantially longer. With this structure, a load impedance between the upper-housing circuit 8 and the lower-housing circuit 9 is to be increased, thus reducing a high-frequency current which deteriorates antenna characteristics of the antenna 12.

The connection unit according to the fourth example has two points (two areas A and C) for connecting to the upper-housing circuit 8 and two points (areas B and D) for connecting to the lower-housing circuit 9. It is also possible that the connection unit has more than two points or areas for the connection to each circuit. In this case, it is necessary that areas of the connection unit to be connected to the circuit should be positioned alternately, and any part of the connection unit should avoid contact each other and with other parts of the terminal.

In this example, the area A of the connection unit is concerned in the electrical connection to the upper-housing circuit 8, and the area D, to the lower-housing circuit 9. This is one configuration. Another configuration is also possible where the connection unit is electrically connected to the upper-housing circuit 8 and the lower-housing circuit 9 through a plurality of areas, say, combination of areas A, B, C and D.

Figure 15A:
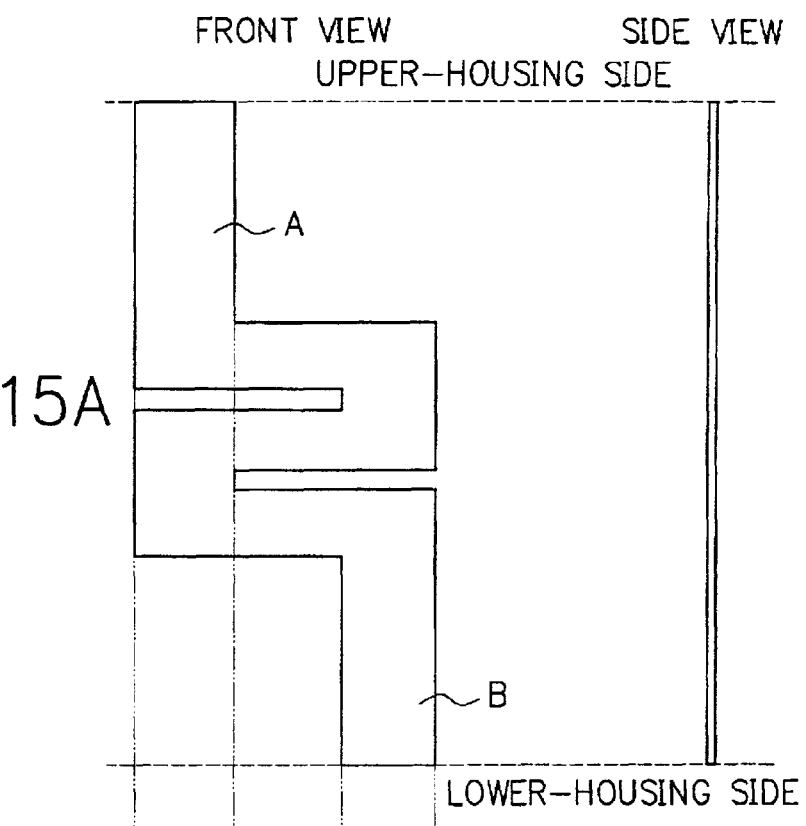
FIGS. 15A and 15B are related to a structure of a fifth connection unit according to the first embodiment.

Next, a connection unit according to a fifth example will be described in detail with reference to FIG. 15A. As shown in FIG. 15A, the connection unit according to a fifth example is constructed to have crank-shaped portions in its central part, which reside inside the hinge 17. The crank-shaped portions may take different forms when the upper housing 1 and the lower housing 2 are moved around the hinge 17. Accordingly, the force applied to the connection unit is dispersed, thus preventing the connection unit from being damaged.

Figure 15B:
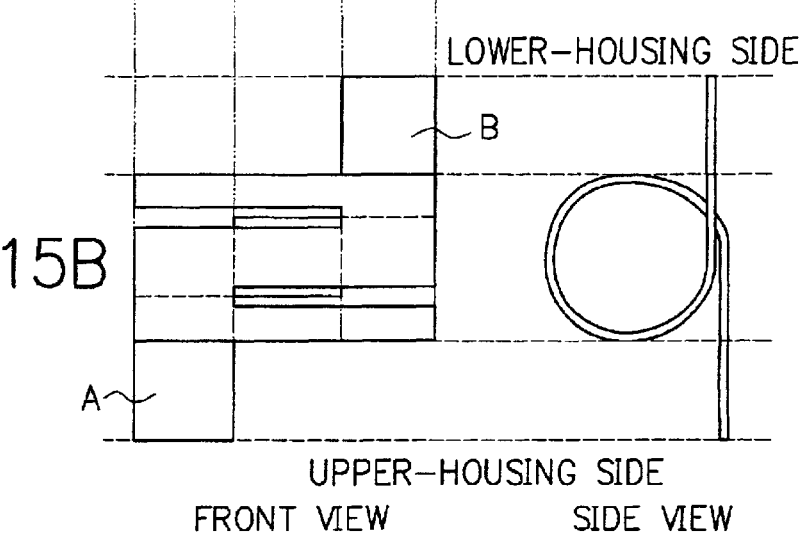

The connection unit may be partially rolled up where there are the crank-shaped portions, as shown in FIG. 15B, to have a ring portion. This is a sixth example of a connection unit. It is therefore understood that the ring portion of the connection unit according to a sixth example serves as a coil, which provides a load impedance between the upper-housing circuit 8 and the lower-housing circuit 9, larger than that provided by the connection unit according to a fifth example (see FIG. 15A).

Figure 16:
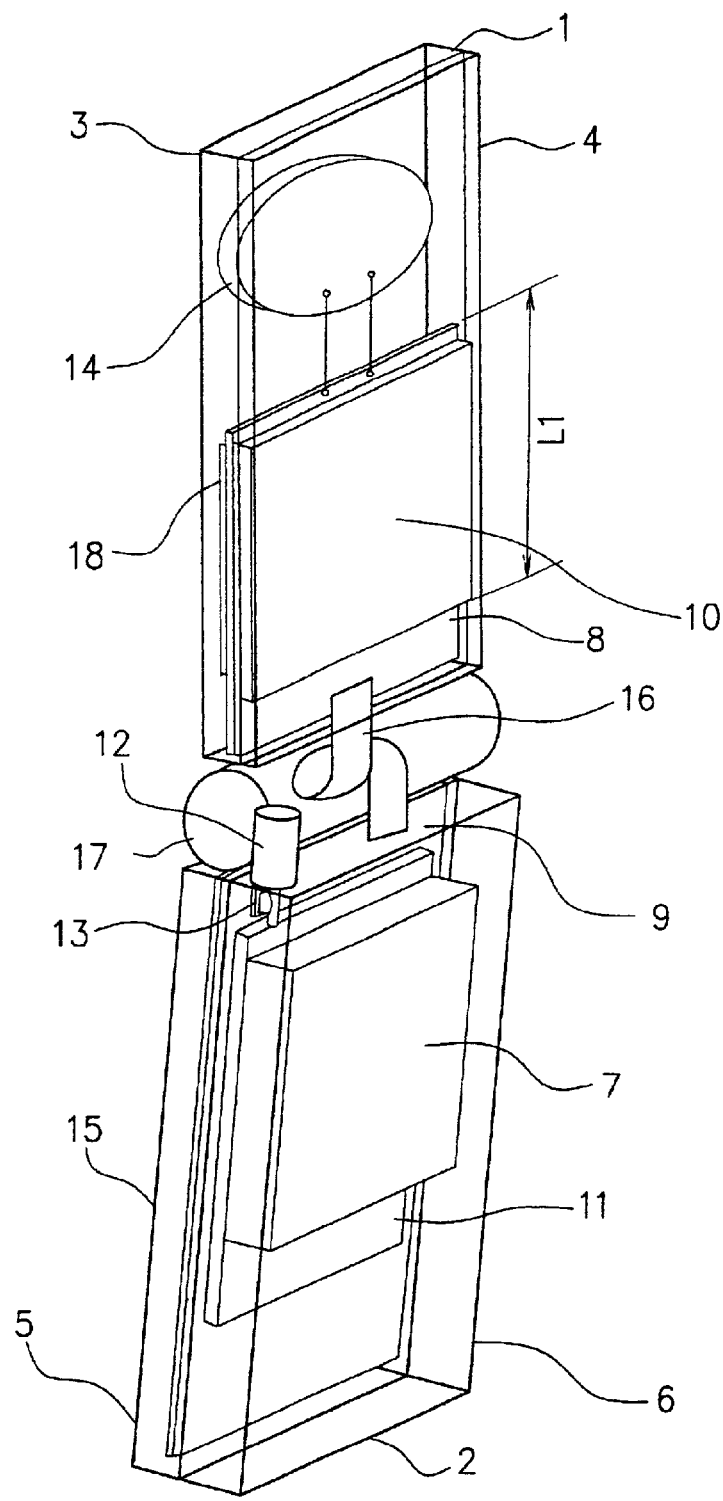
FIG. 16 is an oblique perspective view showing a structure of a foldable portable radio terminal according to a second embodiment of the present invention.

Second Embodiment:

Description of a second embodiment according to the present invention will be given of by referring to the accompanying drawings. FIG. 16 shows a foldable portable radio terminal according to a second embodiment, where the length (L1) of the upper-housing circuit 8 is shorter than that of the terminal according to the first embodiment as shown in FIG. 7.

The foldable portable radio terminal according to the present embodiment is constructed so that the length (L1) of the upper-housing circuit 8 is approximately half of the length (L2) of the lower-housing circuit 9 as shown in FIG. 16. Furthermore, the whole of the upper housing 1 is made of mold, while the remaining parts are constructed in the same way as the first embodiment. This comes from the reason that the upper housing 1 and the upper-housing circuit 8 are required to be electrically connected each other, and therefore a change in the length of the upper-housing circuit 8 has no effects.

Figure 1:
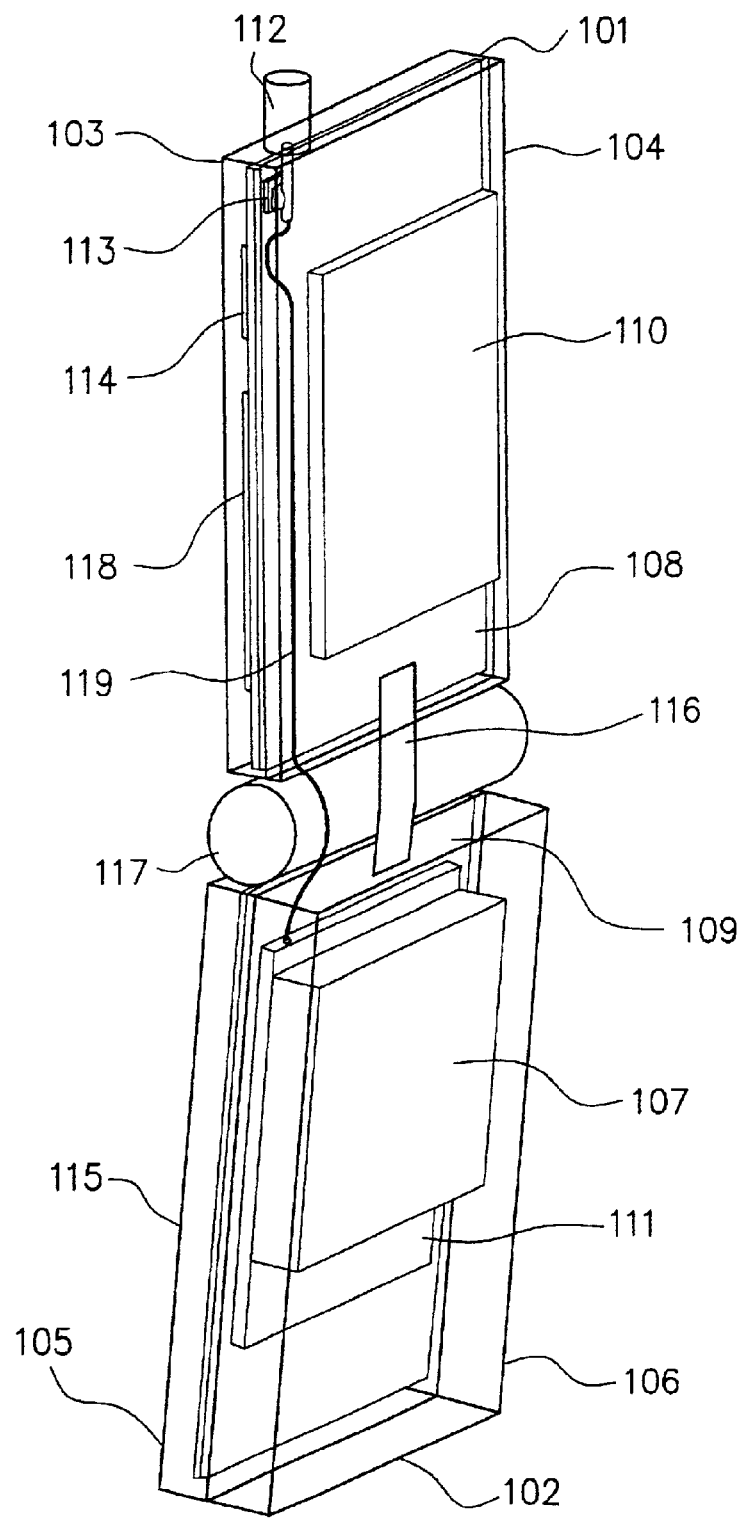
FIG. 1 is an oblique perspective view of a first conventional foldable portable radio terminal.
Figure 2:
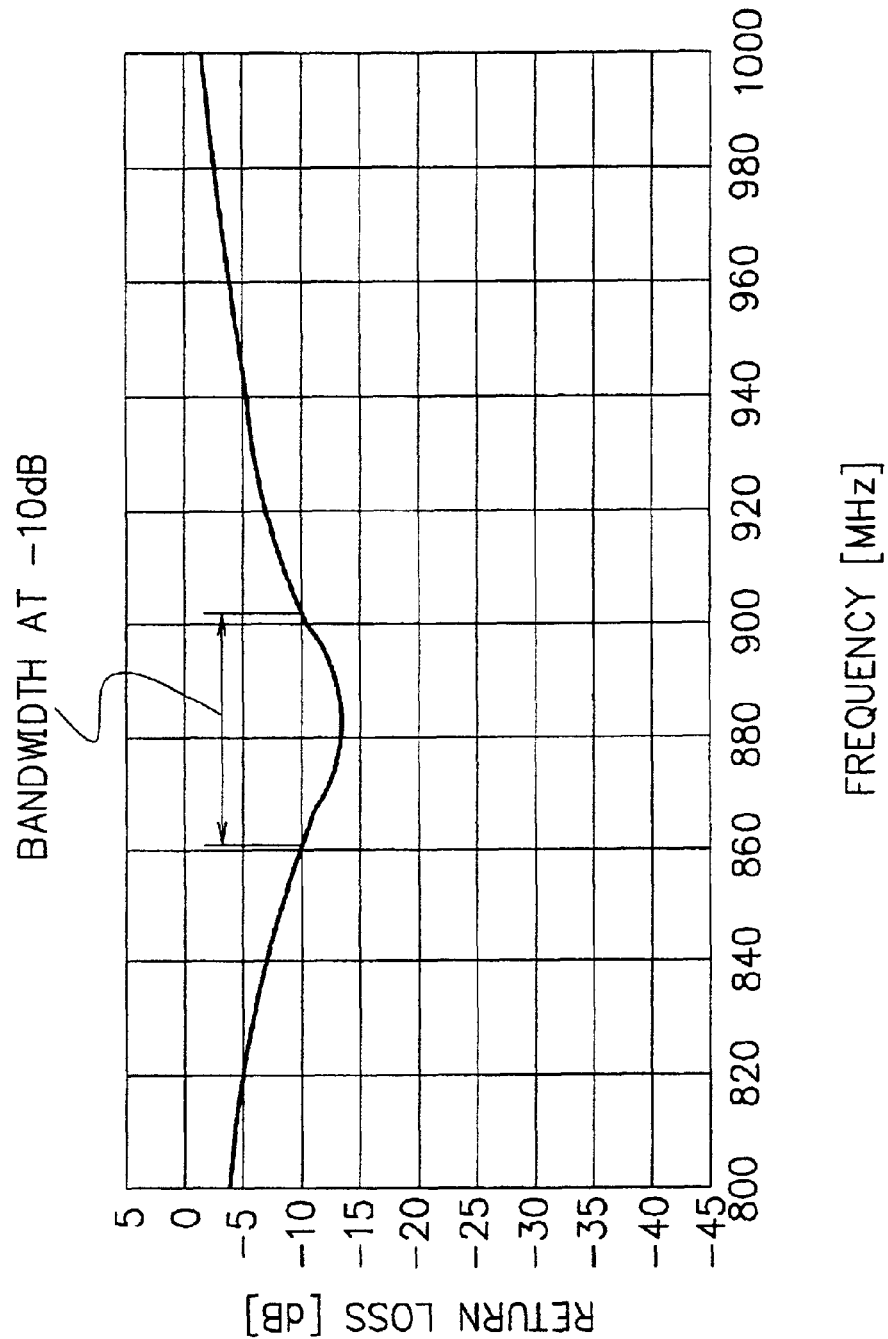
FIG. 2 is a chart showing antenna characteristics according to the first conventional terminal.
Figure 4:
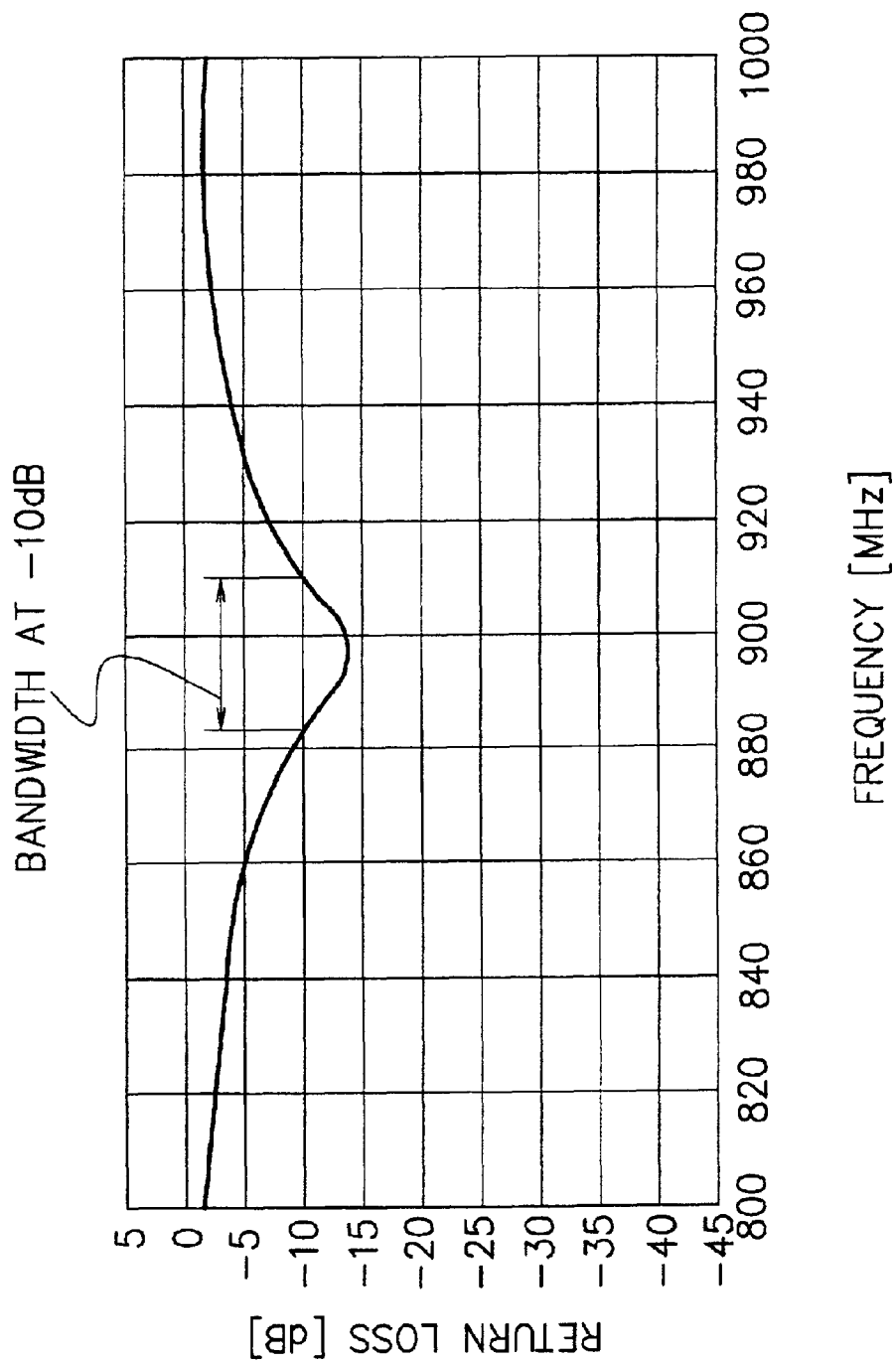
FIG. 4 is a chart showing antenna characteristics of the second conventional terminal.
Figure 17:
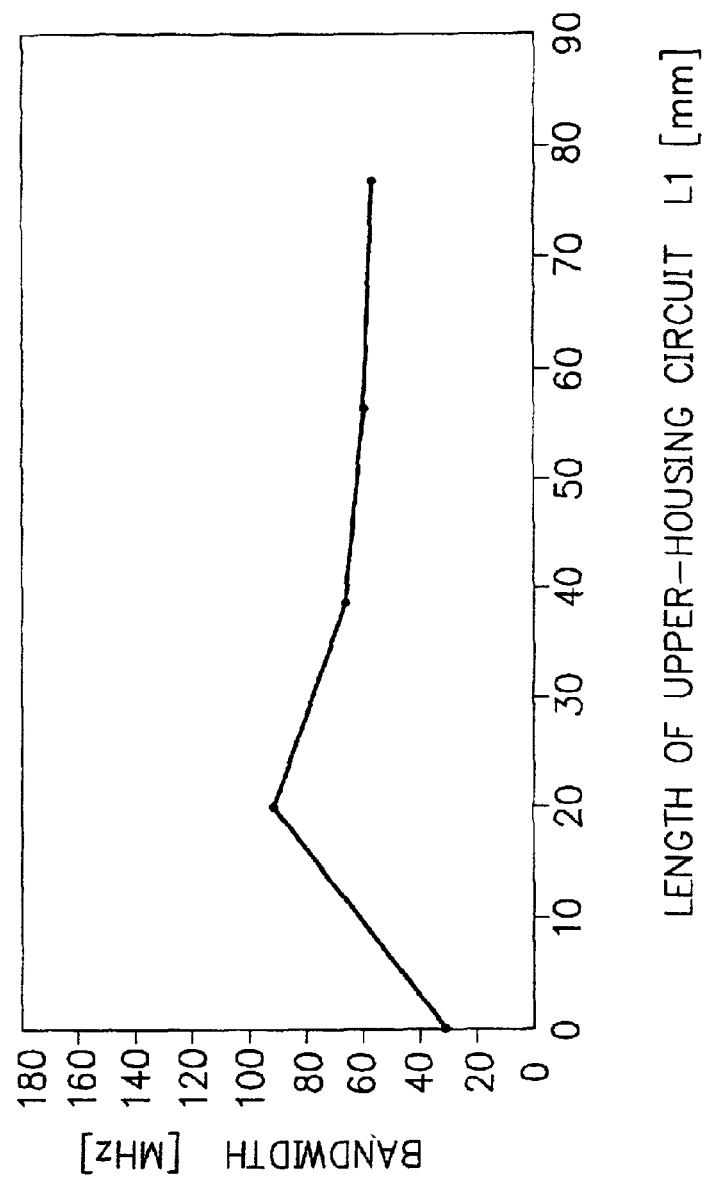
FIG. 17 is a chart with respect to relationships between a length (L1) of an upper-housing circuit and a bandwidth over which an antenna can transmit/receive signals, according to the second embodiment of the present invention.

FIG. 17 is a chart showing relationships between the length (L1) of the upper-housing circuit 8 and a bandwidth over which an antenna can transmit and/or receive signals. The foldable portable radio terminal according to a second embodiment has the same dimensions as those of the first embodiment, excepting the length (L1) of the upper-housing circuit 8. That is, the upper-housing circuit 8 is approx. 75 mm (L1 of FIG. 2)×40 mm, and the lower circuit 9 is approx. 75 mm (L2 of FIG. 2)×40 mm. Metallic part of the lower housing 2 is approx. 90 mm×45 mm, and the spacing (G) between the upper-housing circuit 8 and the lower-housing circuit 9 is approx. 15 mm.

It is apparent from the chart of FIG. 17 that the foldable portable radio terminal whose upper housing 1 is made of mold shows satisfactory characteristics with respect to performance of the antenna 12 and a broader bandwidth over which the antenna can transmit and/or receive signals, when the upper-housing circuit 8 has the length (L1) of somewhere between 15 mm and 35 mm. (If the upper-housing circuit 8 has the length of 35 mm, it indicates that the circuit 8 is approx. half the length of the lower-housing circuit 9.) Therefore, the upper-housing circuit 8 of the foldable portable radio terminal according to the second embodiment is set to have the length (L1) of somewhere between 15 mm and 35 mm.

When the upper-housing circuit 8 is connected to the receiver 14 as shown in FIG. 16, a high-frequency current flows through a connection wiring from the upper-housing circuit 8 to the receiver 14. In this configuration, the length of the upper-housing circuit 8 is apparently equivalent to the length of the upper-housing circuit 8 together with the length of the receiver 14. Therefore, there is a possibility that the above-mentioned advantages cannot be obtained.

Accordingly, in the second embodiment, an inductance will be loaded between the upper-housing circuit 8 and the receiver 14 when the circuit and receiver are connected. In this way, as far as a high-frequency current is concerned, it is possible to separate the upper-housing circuit 8 from the receiver 14. This configuration brings about satisfactory antenna characteristics and the like as shown in the chart of FIG. 17. It is noted that structure for loading an inductance is not restricted and will be omitted here.

Third Embodiment:

A foldable portable radio terminal according to a third embodiment of the present invention will be explained, where either the upper-housing front panel 3 of the upper housing 1 or the lower-housing front panel 5 of the lower housing 2 is made of metal (diecast). In this structure, a front portion of the housing (the upper-housing front panel 3 or the lower-housing front panel 5) made of metal is connected to an earth plain of a circuit provided in the same housing. Remaining parts of the housing (the upper-housing rear panel 4, the lower-housing rear panel 6, and either the upper-housing front panel 3 or the lower-housing front panel 5) are made of mold (insulator). With this configuration, mold exists between metallic parts and the antenna 12, whereby an electric field generated by a high-frequency current on the front panel of the housing causes no adverse effects on the antenna 12. The terminal according to the third embodiment therefore attains the same advantages as those obtained by the above-mentioned embodiments.

The terminal according to the third embodiment may also have a configuration where the upper-housing front panel 3 and the lower-housing front panel 5 are made of metal, while the upper-housing rear panel 4 and the lower-housing rear panel 6 are made of mold. In this configuration, it is required that the upper-housing front panel 3 and the lower-housing front panel 5 are structured to have no contact, that is, no electrical connection each other, when the foldable portable radio terminal is unfolded.

If the upper-housing front panel 3 and the lower-housing front panel 5 are made of metal and no electric contact is produced between them, it is possible to provide a foldable portable radio terminal which is stronger and more durable than a terminal that is entirely made of mold or one of the front panels is made of metal.

What is claimed is:

1. A foldable portable radio terminal having a first housing for including a first circuit unit inside and a second housing for including a second circuit unit inside, said first and second housings are connected through the intermediary of a hinge so as to rotate around said hinge, said terminal comprising:

power-supply means for supplying power to said first and second circuit units; and connecting means for electrically connecting said first and second circuit units, wherein said connecting means having a prescribed shape and length, so that said connecting means generates an inductance which serves as a load to a high-frequency current.

2. A foldable portable radio terminal according to claim 1, wherein said connecting means is a flexible board having conductors for generating said inductance.

3. A foldable portable radio terminal according to claim 2, wherein said prescribed shape is a shape where said connecting means partially has a spiral structure with one or more of turns, and said prescribed length is a length capable of connecting said first and second circuit units with said spiral structure being maintained.

4. A foldable portable radio terminal according to claim 3, wherein said connecting means, when it is expanded, is S-shaped including first, second and third zonal areas, said first zonal area corresponding to one end portion of said connecting means and being connected to said first circuit unit, said second zonal area corresponding to another end portion of said connecting means and being connected to said second circuit unit, and said third zonal area corresponding to an area which lies intermediary of said first and second zonal areas, and wherein said third zonal area being associated with a portion where said spiral structure is formed and having a length for avoiding interconnection between said first and second zonal areas when said spiral structure is being maintained.

5. A foldable portable radio terminal according to claim 4, wherein said connecting means is arranged to go through said hinge.

6. A foldable portable radio terminal according to claim 5, wherein said connecting means is housed inside said hinge at a portion where said spiral structure is formed.

7. A foldable portable radio terminal according to claim 2, wherein said prescribed shape is a shape where said connecting means partially has a coil structure, and said prescribed length is a length capable of connecting said first and second circuit units with said coil structure being maintained.

8. A foldable portable radio terminal according to claim 7, wherein said connecting means, when it is expanded, is tuning-fork shaped including first, second and third zonal areas, said first zonal area corresponding to one end portion of one prong and being connected to said first circuit unit, said second zonal area corresponding to another end portion of another prong and being connected to said first circuit unit, and said third zonal area corresponding to an end portion of a stem and being connected to said second circuit unit, wherein a portion where said prongs and stem merge and its vicinity is rolled up to form said coil structure, and wherein said first, second and third zonal areas are arranged apart for avoiding interconnection when said coil structure is being maintained.

9. A foldable portable radio terminal according to claim 8, wherein said connecting means is arranged to go through said hinge.

10. A foldable portable radio terminal according to claim 9, wherein said connecting means is housed inside said hinge at a portion where said coil structure is formed.

11. A foldable portable radio terminal according to claim 7, wherein said connecting means, when it is expanded, has a shape in which a plurality of tuning-fork shapes are turned and partially overlapped each other to form a plurality of prongs including first and second zonal areas, said first zonal area corresponding to first end portions of said prongs which are facing in the same direction, said second zonal area corresponding to second end portions of said prongs which are facing in the direction opposed to said first end portions, wherein a portion where said plurality of prongs merge and its vicinity is rolled up to form said coil structure, and wherein said first and second zonal areas are arranged apart for avoiding interconnection when said coil structure is being maintained.

12. A foldable portable radio terminal according to claim 11, wherein said connecting means is arranged to go through said hinge.

13. A foldable portable radio terminal according to claim 12, wherein said connecting means is housed inside said hinge at a portion where said coil structure is formed.

14. A foldable portable radio terminal according to claim 3, wherein said connecting means, when it is expanded, has a shape including first, second and third zonal areas, said first zonal area corresponding to one end portion of said connecting means and being connected to said first circuit unit, said second zonal area corresponding to another end portion of said connecting means and being connected to said second circuit unit, and said third zonal area corresponding to a portion which lies intermediary of said first and second zonal areas and takes a crank shape.

15. A foldable portable radio terminal according to claim 14, wherein said portion associated with said crank shape and its vicinity is formed to have a coil structure and having a length for avoiding interconnection between said first and second zonal areas when said coil structure is being maintained.

16. A foldable portable radio terminal according to claim 15, wherein said connecting means is arranged to go through said hinge.

17. A foldable portable radio terminal according to claim 15, wherein said connecting means is housed inside said hinge at a portion where said coil structure is formed.

18. A foldable portable radio terminal according to claim 1, wherein antenna unit and radio unit to which power is supplied from said power-supply means are included in the same housing as said power-supply means.

19. A foldable portable radio terminal according to claim 18, wherein said antenna unit and radio unit are connected to said second circuit unit within said second housing, said first circuit unit having a length of approximately half of said second circuit unit.

20. A foldable portable radio terminal according to claim 2, wherein said first housing is made of metal and said second housing is made of insulator, said first housing being electrically connected to said first circuit unit.

21. A foldable portable radio terminal according to claim 20, wherein said first housing comprising a front panel and a rear panel has configurations either where said front panel being made of metal and said rear panel being made of insulator or where said front panel being made of insulator and said rear panel being made of metal, said panels made of metal being electrically connected to said first circuit unit.

22. A foldable portable radio terminal according to claim 2, wherein said first housing is made of insulator and said second housing is made of metal, said second housing being electrically connected to said second circuit unit.

23. A foldable portable radio terminal according to claim 22, wherein said second housing comprising a front panel and a rear panel has configurations either where said front panel being made of metal and said rear panel being made of insulator or where said front panel being made of insulator and said rear panel being made of metal, said panels made of metal being electrically connected to said second circuit unit.

24. A foldable portable radio terminal according to claim 2, wherein said first and second housings are made of metal, and wherein no electrical connections are provided between said first housing and second housing.

25. A foldable portable radio terminal according to claim 24, wherein said first and second housings respectively comprise a front panel and a rear panel, said front panel of said first housing being made of metal and said rear panel of said first housing being made of insulator, said front panel of said second housing being made of metal and said rear panel of said second housing being made of insulator, and wherein no electrical connections are provided between said front panels.

26. A foldable portable radio terminal having a first housing for housing a first circuit unit and a second housing for housing a second circuit unit, said first and second housings being connected through a hinge so as to rotate around said hinge, said terminal comprising:
  a power-supply for supplying power to said first and second circuit units; and
  a connection unit for electrically connecting said first and second circuit units;
  wherein said connection unit has a prescribed shape and length, so that said connection unit generates an inductance which serves as a load to a high-frequency current.

27. A foldable portable radio terminal according to claim 26,
wherein said connection unit is a flexible board having conductors for generating said inductance.

28. A foldable portable radio terminal according to claim 27,
wherein said prescribed shape is a shape where said connection unit partially has a spiral structure with one or more of turns, and said prescribed length is a length capable of connecting said first and second circuit units with said spiral structure being maintained.

29. A foldable portable radio terminal according to claim 28,
wherein said connection unit, when it is expanded, is S-shaped including first, second and third zonal areas, said first zonal area corresponding to one end portion of said connection unit and being connected to said first circuit unit, said second zonal area corresponding to another end portion of said connection unit and being connected to said second circuit unit, and said third zonal area corresponding to an area which lies intermediary of said first and second zonal areas; and
wherein said third zonal area being associated with a portion where said spiral structure is formed and having a length for avoiding interconnection between said first and second zonal areas when said spiral structure is being maintained.

30. A foldable portable radio terminal according to claim 29,
wherein said connection unit is arranged to go through said hinge.

31. A foldable portable radio terminal according to claim 30,
wherein said connection unit is housed inside said hinge at a portion where said spiral structure is formed.

32. A foldable portable radio terminal according to claim 27,
wherein said prescribed shape is a shape where said connection unit partially has a coil structure, and said prescribed length is a length capable of connecting said first and second circuit units with said coil structure being maintained.

33. A foldable portable radio terminal according to claim 32,
wherein said connection unit, when it is expanded, is tuning-fork shaped including first, second and third zonal areas, said first zonal area corresponding to one end portion of one prong and being connected to said first circuit unit, said second zonal area corresponding to another end portion of another prong and being connected to said first circuit unit, and said third zonal area corresponding to an end portion of a stem and being connected to said second circuit unit;
wherein a portion where said prongs and stem merge and its vicinity is rolled up to form said coil structure; and
wherein said first, second and third zonal areas are arranged apart for avoiding interconnection when said coil structure is being maintained.

34. A foldable portable radio terminal according to claim 33,
wherein said connection unit is arranged to go through said hinge.

35. A foldable portable radio terminal according to claim 34,
wherein said connection unit is housed inside said hinge at a portion where said coil structure is formed.

36. A foldable portable radio terminal according to claim 32,
wherein said connection unit, when it is expanded, has a shape in which a plurality of tuning-fork shapes are turned and partially overlap each other to form a plurality of prongs including first and second zonal areas, said first zonal area corresponding to first end portions of said prongs which are facing in the same direction, said second zonal area corresponding to second end portions of said prongs which are facing in the direction opposed to said first end portions;
wherein a portion where said plurality of prongs merge and its vicinity is rolled up to form said coil structure; and
wherein said first and second zonal areas are arranged apart for avoiding interconnection when said coil structure is being maintained.

37. A foldable portable radio terminal according to claim 36,
wherein said connection unit is arranged to go through said hinge.

38. A foldable portable radio terminal according to claim 37,
wherein said connection unit is housed inside said hinge at a portion where said coil structure is formed.

39. A foldable portable radio terminal according to claim 28,
wherein said connection unit, when it is expanded, has a shape including first, second and third zonal areas, said first zonal area corresponding to one end portion of said connection unit and being connected to said first circuit unit, said second zonal area corresponding to another end portion of said connection unit and being connected to said second circuit unit, and said third zonal area corresponding to a portion which lies intermediary of said first and second zonal areas and takes a crank shape.

40. A foldable portable radio terminal according to claim 39,
wherein said portion associated with said crank shape and its vicinity is formed to have a coil structure and having a length for avoiding interconnection between said first and second zonal areas when said coil structure is being maintained.

41. A foldable portable radio terminal according to claim 40,
wherein said connection unit is arranged to go through said hinge.

42. A foldable portable radio terminal according to claim 40,
wherein said connection unit is housed inside said hinge at a portion where said coil structure is formed.

43. A foldable portable radio terminal according to claim 26,
wherein an antenna unit and a radio unit to which power is supplied from said power-supply are included in the same housing as said power-supply.

44. A foldable portable radio terminal according to claim 43,
wherein said antenna unit and said radio unit are connected to said second circuit unit within said second housing, said first circuit unit having a length of approximately half of said second circuit unit.

45. A foldable portable radio terminal according to claim 27, wherein said first housing is made of metal and said second housing is made of insulator, said first housing being electrically connected to said first circuit unit.

46. A foldable portable radio terminal according to claim 45, wherein said first housing comprising a front panel and a rear panel has configurations either where said front panel being made of metal and said rear panel being made of insulator or where said front panel being made of insulator and said rear panel being made of metal, said panels made of metal being electrically connected to said first circuit unit.

47. A foldable portable radio terminal according to claim 27, wherein said first housing is made of insulator and said second housing is made of metal, said second housing being electrically connected to said second circuit unit.

48. A foldable portable radio terminal according to claim 47, wherein said second housing comprising a front panel and a rear panel has configurations either where said front panel being made of metal and said rear panel being made of insulator or where said front panel being made of insulator and said rear panel being made of metal, said panels made of metal being electrically connected to said second circuit unit.

49. A foldable portable radio terminal according to claim 27, wherein said first and second housings are made of metal, and wherein no electrical connections are provided between said first housing and said second housing.

50. A foldable portable radio terminal according to claim 26, wherein said first and second housings respectively comprise a front panel and a rear panel, said front panel of said first housing being made of metal and said rear panel of said first housing being made of insulator, said front panel of said second housing being made of metal and said rear panel of said second housing being made of insulator, and wherein no electrical connections are provided between said front panels.

* * * * *